US011819371B2

(12) United States Patent
David et al.

(10) Patent No.: US 11,819,371 B2
(45) Date of Patent: Nov. 21, 2023

(54) SYSTEM FOR HYBRID DENTURE FABRICATION

(71) Applicants: Joel David, Jacksonville, FL (US); Daniel Noorthoek, Boca Raton, FL (US); Miro Kalinowski, Jacksonville, FL (US)

(72) Inventors: Joel David, Jacksonville, FL (US); Daniel Noorthoek, Boca Raton, FL (US); Miro Kalinowski, Jacksonville, FL (US)

( * ) Notice: Subject to any disclaimer, the term of this patent is extended or adjusted under 35 U.S.C. 154(b) by 519 days.

(21) Appl. No.: 16/965,641

(22) PCT Filed: Jan. 29, 2019

(86) PCT No.: PCT/US2019/015633
§ 371 (c)(1),
(2) Date: Jul. 29, 2020

(87) PCT Pub. No.: WO2019/148180
PCT Pub. Date: Aug. 1, 2019

(65) Prior Publication Data
US 2021/0038351 A1 Feb. 11, 2021

Related U.S. Application Data

(60) Provisional application No. 62/623,475, filed on Jan. 29, 2018.

(51) Int. Cl.
*A61C 13/00* (2006.01)
*A61C 13/01* (2006.01)

(52) U.S. Cl.
CPC ...... *A61C 13/0004* (2013.01); *A61C 13/0006* (2013.01); *A61C 13/01* (2013.01)

(58) Field of Classification Search
CPC . A61C 13/0004; A61C 13/0006; A61C 13/01; A61C 13/0003; A61C 8/0048
See application file for complete search history.

(56) References Cited

U.S. PATENT DOCUMENTS 9,308,055 B2 * 4/2016 Fisker ..................... G06F 30/00
9,411,910 B2    8/2016 Methot
(Continued)

OTHER PUBLICATIONS

International Search Report and Written Opinion, issued in corresponding application No. PCT/US/2019/015633, dated Apr. 26, 2019, 9 pages.

*Primary Examiner* — Rick K Chang
(74) *Attorney, Agent, or Firm* — Meunier Carlin & Curfman LLC

(57) ABSTRACT

Described herein is a system for hybrid denture fabrication. The system improve the efficiency of the fabrication process for both the dental service provider (e.g., dentist, dental surgeon, etc.) and the patient. A permanent hybrid prosthesis (e.g., the bridge and its reinforcing bar) can be fabricated within 24 hours of the surgical procedure using the system described herein. This makes it possible to deliverer the permanent hybrid prosthesis within 48 hours (or even within 24 hours) of the surgical procedure. Additionally, the system eliminates the need to provide the patient with a temporary denture following the surgery. Further, the system substantially reduces the patient's chair-time and/or the number of patient visits.

9 Claims, 24 Drawing Sheets

(56) References Cited

U.S. PATENT DOCUMENTS

| | | | |
|---|---|---|---|
| 9,545,296 B2 | 1/2017 | Hansen | |
| 2009/0081618 A1 | 3/2009 | Lamar | |
| 2013/0277874 A1* | 10/2013 | Johnson | A61C 13/0006 264/16 |
| 2014/0329194 A1* | 11/2014 | Sachdeva | A61C 7/002 433/24 |
| 2015/0202024 A1* | 7/2015 | Fisker | G16H 20/40 433/213 |
| 2016/0270886 A1 | 9/2016 | Schulter et al. | |

* cited by examiner

View Right

View Right

View Left

View Bottom

View Front

View Top

SYSTEM FOR HYBRID DENTURE FABRICATION

CROSS-REFERENCE TO RELATED APPLICATIONS

This application is a national stage application filed under 35 U.S.C. § 371 of PCT/US2019/015633 filed on Jan. 29, 2019, which claims the benefit of U.S. provisional patent application No. 62/623,475, filed on Jan. 29, 2018, and entitled "SYSTEMS AND METHODS FOR HYBRID DENTURE FABRICATION," the disclosures of which are expressly incorporated herein by reference in their entireties.

BACKGROUND

Conventional hybrid denture fabrication is time consuming with individual cases sometimes spanning 6-8 months from patient surgery to delivery of the permanent hybrid denture. A hybrid denture is a fixed, permanent hybrid prosthesis that can include a bridge, which includes prosthetic teeth and gingiva, along with a reinforcing bar. This process typically requires 15 hours of patient chair-time and numerous office visits to make temporary denture adjustments.

SUMMARY

Described herein are systems and methods for hybrid denture fabrication. The systems and methods can be used to fabricate a full arch (i.e., a hybrid prosthesis for each of the patient's upper and lower arches). Alternatively, the systems and methods can be used to fabricate only one arch (i.e., a hybrid prosthesis for the patient's upper or lower arch only). The systems and methods improve the efficiency of the fabrication process for both the dental service provider (e.g., dentist, dental surgeon, etc.) and the patient. A permanent hybrid prosthesis (e.g., the bridge and its reinforcing bar) can be fabricated within 24 hours of the surgical procedure using the systems and methods described herein. This makes it possible to deliver the permanent hybrid prosthesis within 48 hours (or even within 24 hours) of the surgical procedure. Additionally, the system and methods eliminate the need to provide the patient with a temporary denture following the surgery. Further, the systems and methods substantially reduce the patient's chair-time and/or the number of patient visits.

An example computer-implemented method for designing a hybrid denture for a patient is described herein. The method can include receiving patient data including a post-surgical virtual waxup of the patient's upper or lower arch, where the post-surgical virtual waxup includes respective positions of a plurality of implants. The method can also include selecting a digital tooth model from a library comprising a plurality of different digital tooth models, creating a customized tooth model for the patient by merging the selected digital tooth model with the post-surgical virtual waxup and changing a respective pose of at least one tooth in the selected digital tooth model, and creating a customized reinforcing bar model based on the respective positions of the plurality of implants within the post-surgical virtual waxup. The method can further include providing a spacing layer having a predetermined thickness over at least a portion of the customized reinforcing bar model, merging the customized tooth model with the customized reinforcing bar model with the spacing layer, and generating milling instructions for the hybrid denture.

In some implementations, the predetermined thickness is between about 0.2 millimeter (mm) and 0.5 mm. Optionally, the predetermined thickness is about 0.2 mm.

Alternatively or additionally, the selected digital tooth model includes a plurality of digital teeth arranged in an arch-specific relationship.

Alternatively or additionally, the method can optionally further include creating a plurality of fastener channels corresponding to each of the plurality of implants in the customized tooth model and the customized reinforcing bar model.

Alternatively or additionally, the post-surgical virtual waxup can include three-dimensional (3D) scan data of at least one of: a post-surgical impression model of the patient's upper or lower arch, the post-surgical impression model of the patient's upper or lower arch with a plurality of implant scan markers installed therein, and/or the post-surgical impression model of the patient's upper or lower arch with a wax bite rim applied thereto.

Alternatively or additionally, the patient data can further include 3D scan data of a pre-surgical impression model of the patient's upper or lower arch.

An example method for fabricating a hybrid denture for a patient is also described herein. The method can include designing the hybrid denture according to the computer-implemented method for designing a hybrid denture as described above. The method can also include, using the generated milling instructions, milling a customized reinforcing bar and customized bridge for the patient, and joining the customized reinforcing bar and the customized teeth.

In some implementations, the hybrid denture is a permanent hybrid denture. Optionally, the permanent hybrid denture is fabricated within 24 hours following the patient's surgery.

An example system for fabricating a hybrid denture is also described herein. The system can include a three-dimensional (3D) scanner configured to capture patient data, a computing device, and a milling machine. The computing device can be configured to implement the computer-implemented method for designing a hybrid denture as described above. Additionally, the milling machine can be configured to mill the hybrid denture using the missing instructions.

Another example method for fabricating a permanent hybrid denture for a patient is described herein. The method can include fabricating the permanent hybrid denture within 24 hours following the patient's surgery.

In some implementations, the method can further include delivering the permanent hybrid denture to the patient within 48 hours following the patient's surgery.

Alternatively or additionally, the method can further include designing the permanent hybrid denture using a fully-digital process. The fully-digital process can include creating a customized tooth model for the using a post-surgical virtual waxup that includes respective positions of a plurality of implants, creating a customized reinforcing bar model based on the respective positions of the plurality of implants within the post-surgical virtual waxup, providing a spacing layer having a predetermined thickness over at least a portion of the customized reinforcing bar model, merging the customized tooth model with the customized reinforcing bar model with the spacing layer, and generating milling instructions for the hybrid denture. In some implementations, the predetermined thickness is between about 0.2 millimeter (mm) and 0.5 mm. Optionally, the predetermined thickness is about 0.2 mm. Alternatively or additionally, the fully-digital process can includes one or more steps of the computer-implemented method described herein.

Alternatively or additionally, the permanent hybrid denture can include a custom-milled reinforcing bar and custom-milled bridge, where the custom-milled reinforcing bar and the custom-milled bridge are joined with about 0.2 millimeter (mm) fit.

Other systems, methods, features and/or advantages will be or may become apparent to one with skill in the art upon examination of the following drawings and detailed description. It is intended that all such additional systems, methods, features and/or advantages be included within this description and be protected by the accompanying claims.

BRIEF DESCRIPTION OF THE DRAWINGS

The components in the drawings are not necessarily to scale relative to each other. Like reference numerals designate corresponding parts throughout the several views.

FIG. 2 shows the patient's upper and lower jaws.

FIG. 3 includes an example digital tooth model 100 (e.g., a digital tooth model retrieved from the smile library).

FIG. 4 shows the example digital tooth model 100 with the digital teeth arranged in an arch specific relationship.

FIG. 5 shows the example digital tooth model 100 and includes the scan markers 200, which show the positions of a plurality of implants.

FIG. 6 includes the example digital tooth model 100 with the wax bite rim 300 overlay.

FIG. 7 includes an example custom tooth model 400, which is the digital tooth model following application of patient-specific adjustments.

FIG. 9 includes virtual pillars 600 and virtual projections 700, which can be used to create the fastener channels.

FIG. 10 shows the reinforcing bar model 500 merged with the example custom tooth model 400.

FIG. 12 includes the virtual implants 800.

FIG. 13 shows the reinforcing bar model 500 including a spacing layer 900 overlay (e.g., with about 0.2 millimeter (mm) thickness).

FIG. 15 shows the reinforcing bar model 500 merged with the custom tooth model 400. The spacing layer is not shown in FIG. 15.

FIG. 17 shows the reinforcing bar model 500 with the spacing layer 900 merged with the custom tooth model 400. In FIG. 17, the virtual projections 700, which can be used to create the fastener channels, are shown.

FIGS. 18A-18B show the virtual projections.

DETAILED DESCRIPTION

Figure 1A:
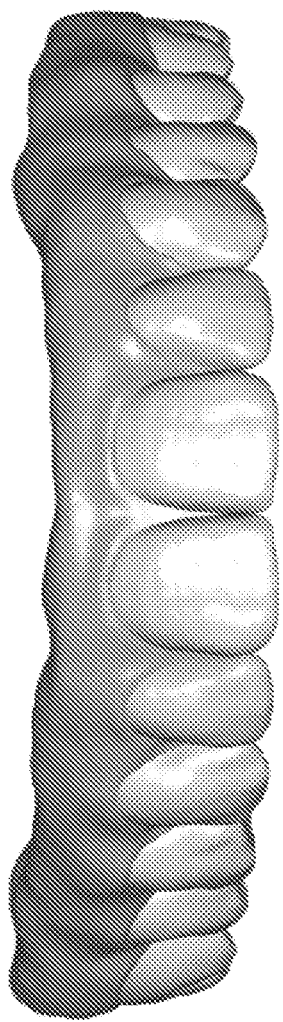
FIGS. 1A-1B illustrate a 3D view (FIG. 1A) and various two-dimensional views (FIG. 1B) of an example custom tooth model according to an implementation described herein.
Figure 1A:
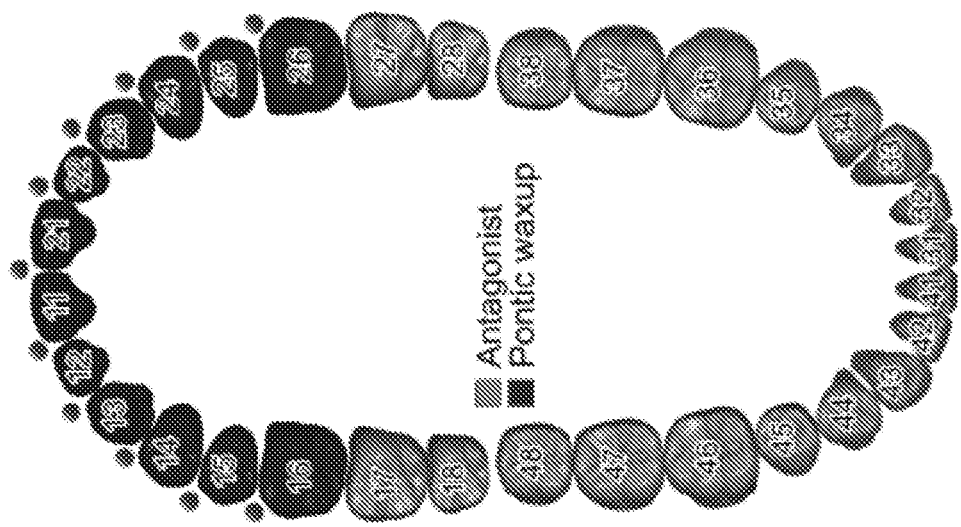
Figure 1B:
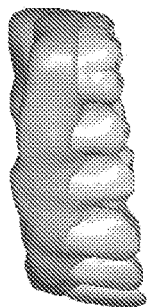
Figure 1B:
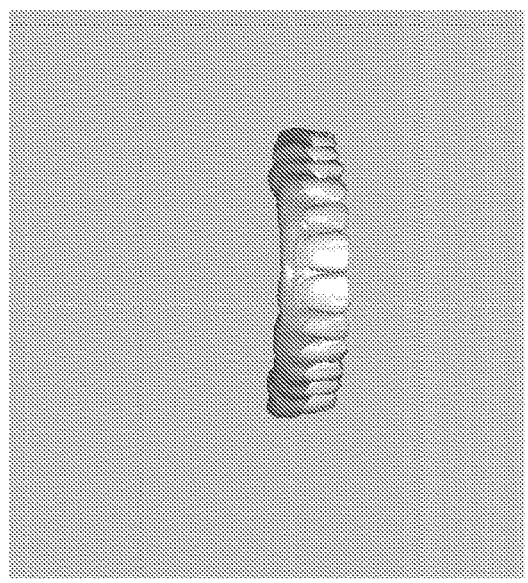
Figure 1B:
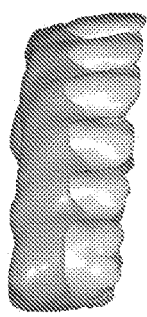
Figure 1B:
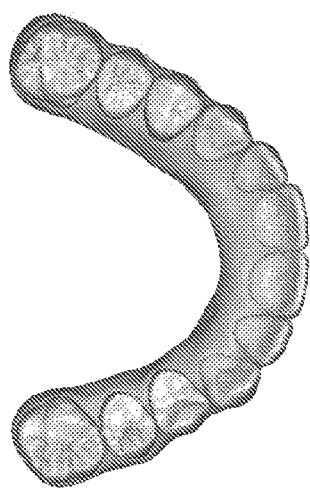
Figure 1B:
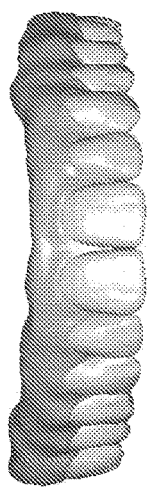
Figure 1B:
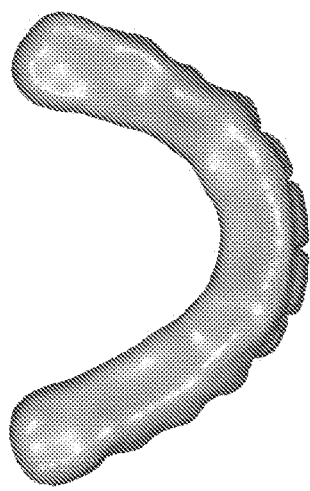

Unless defined otherwise, all technical and scientific terms used herein have the same meaning as commonly understood by one of ordinary skill in the art. Methods and materials similar or equivalent to those described herein can be used in the practice or testing of the present disclosure. As used in the specification, and in the appended claims, the singular forms "a," "an," "the" include plural referents unless the context clearly dictates otherwise. The term "comprising" and variations thereof as used herein is used synonymously with the term "including" and variations thereof and are open, non-limiting terms. The terms "optional" or "optionally" used herein mean that the subsequently described feature, event or circumstance may or may not occur, and that the description includes instances where said feature, event or circumstance occurs and instances where it does not. Ranges may be expressed herein as from "about" one particular value, and/or to "about" another particular value. When such a range is expressed, an aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint. As used herein, the terms "about" or "approximately", when used in reference to a linear dimension (e.g., thickness of the spacing layer), mean within plus or minus 10% percentage of the referenced linear dimension. While implementations will be described for hybrid denture fabrication, it will become evident to those skilled in the art that the implementations are not limited thereto.

The systems and methods described herein can be used to provide a permanent custom-milled bridge that telescopes to around a 200 micron milled fit over a custom-milled reinforcing bar to the patient. In some implementations, the bridge (i.e., prosthetic teeth and gingiva) can be milled from ceramic, and the reinforcing bar can be milled from titanium. This process requires just one surgical appointment followed by a subsequent appointment within about 24 hours to insert the final hybrid prosthesis. In other words, the patient can be totally done within 24 hours using the systems and methods described herein. The hybrid prosthesis can be 100% digitally designed, which makes it possible to deliver the hybrid prosthesis so quickly.

The systems and methods can include use of a three dimensional (3D) facial scanner that allows the user to take pre-operative records of the patient's face. The pre-operative data includes, but is not limited to, 3D scans capturing facial profile, high smile line, mid line, and cant of teeth.

The systems and methods can also include use of a 3D digital scanner to take post-operative records. The systems and methods can use record trays that are scanned and digitalized by the 3D scanner. This post-operative data can optionally be merged with the pre-operative data. This process allows the technician (e.g., designer) to accurately design the bridge substantially perfect mid-line to lip, with the teeth of bridge substantially parallel to the eyes, and with substantially perfect occlusion. The systems and methods can also include use of a digital face bow such as the PLANESYSTEM from ZIRKONZAHN of Gais, Italy. It should be understood that the PLANESYSTEM digital face bow is provided only as an example and that other 3D scanners can be used with the implementations described herein. This allows another level of design accuracy to ensure occlusion and proper plane of bridge.

When the technician starts designing esthetics of bridge, the technician can choose from a custom digital smile library of teeth (sometimes referred to herein as "smile library") that allows the technician to custom match esthetics of bridge to the patient's face type (e.g., square, square tapered, oval, etc.), age, and sex. The smile library has been custom designed to easily merge with the computer-aided design (CAD) software to help allow the restoration to be finished in 24 hours.

According to the systems and methods, a custom tray system can be used to match the custom smile library such that the dentist or surgeon can try different trays in to show the patient different styles of teeth following surgery. The tray system has been designed so the dentists can take on average less than 1 hour to obtain all the records needed to design and fabricate the hybrid prosthesis and have these records ready to digitally scan and send to the design lab. The systems and methods may, in some implementations, require a general dentist or surgeon to have a digital scanner, 3D facial scanner, system training, and design software. Instead of using conventional analog techniques that in many cases take 6-8 months with many patient visits to accomplish, the systems and methods can be used to provide a permanent hybrid prosthesis in 1 surgical visit and within 24 hours from the surgery.

Example System

Figure 22:
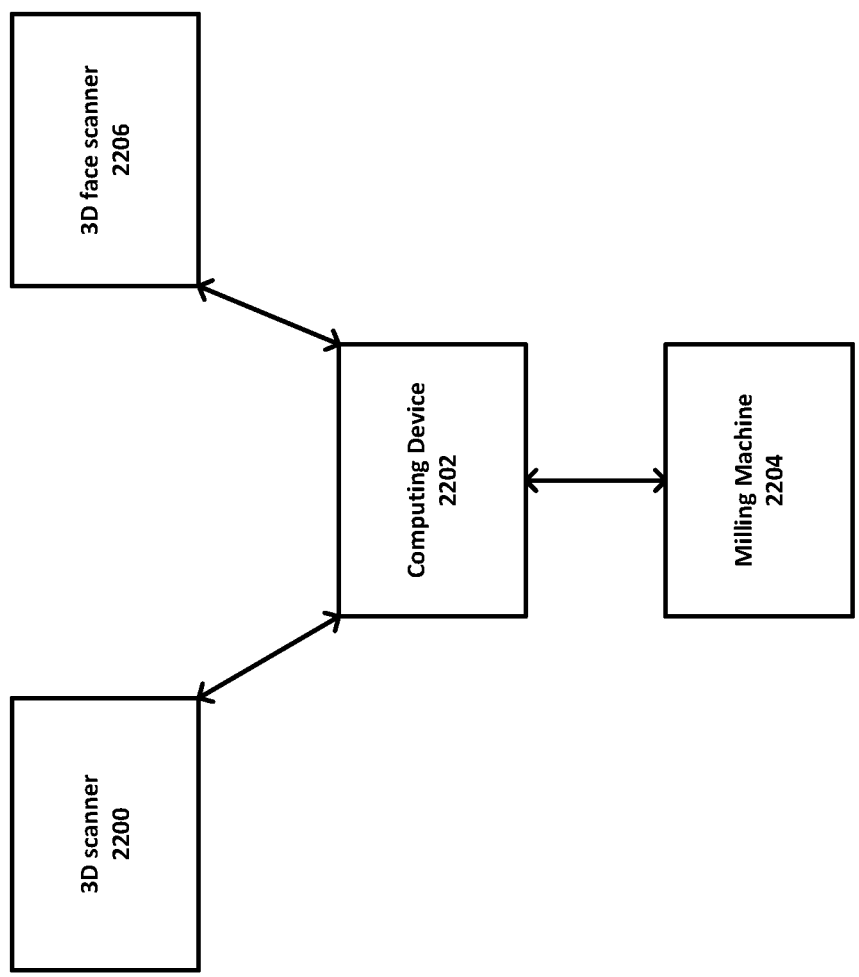
FIG. 22 is a block diagram of an example system for hybrid denture fabrication according to an implementation described herein.

A system for fabricating a hybrid denture (also referred to as "hybrid prosthesis") is described herein. An example system is shown in FIG. 22. The system can include a three-dimensional (3D) scanner 2200 configured to capture pre- and/or post-surgical patient data. In some implementations, the system includes a plurality of 3D scanners. The patient data can include scans of one or more models (e.g., gypsum models) of impressions taken of the patient's dental arch or arches before and/or after implant surgery. The models can be placed on articulator plates before scanning. 3D scanners are known in the art and therefore not described in detail below. An example 3D scanner is the S600 ARTI Scanner from ZIRKONZAHN of Gais, Italy. It should be understood that the ARTI Scanner is provided only as an example and that other 3D scanners can be used with the implementations described herein.

The system can also include a computing device 2202 such as computing device 2100 described with respect to FIG. 21 below. In some implementations, the system includes a plurality of computing devices. This disclosure contemplates that the 3D scan data captured by the 3D scanner can be transmitted to the computing device. The computing device can be configured to run CAD software such as EXOCAD from EXOCAD GmbH of Darmstadt, Germany. It should be understood that EXOCAD is provided only as an example and that other CAD software can be used with the implementations described herein. As described below, a hybrid denture can be designed based on the 3D scan data using the CAD software. The CAD software can be used to create custom-designed models of the hybrid denture from which milling instructions can be generated. For example, milling instructions can be generated using computer aided manufacturing (CAM) software such as HYPERDENT CAM software from FOLLOW-ME Technology Group of Munich, Germany, which can be run on a computing device. It should be understood that HYPERDENT is only provided as an example and that other CAM software can be used to generate milling instructions.

Further, the system can include a milling machine 2204. This disclosure contemplates that the milling instructions can be transmitted to the milling machine. In some implementations, the system can include a plurality of milling machines, e.g., a ceramic milling machine (e.g., for the prosthetic bridge) and a metal milling machine (e.g., for the reinforcing bar). Milling machines are known in the art and therefore not described in detail below. Example soft (e.g., for the ceramics) and metal milling machines are manufactured by ZIRKONZAHN of Gais, Italy. It should be understood that ZIRKONZAHN milling machines are provided only as an example and that other milling machines can be used with the implementations described herein. As described below, the milling machine can be used to mill the hybrid denture, which can include a custom reinforcing bar and custom bridge. In some implementations, the reinforcing bar is titanium. It should be understood that titanium is only provided as an example and that the reinforcing bar can be made from other materials. In some implementations, the bridge is ceramic composite. For example, the bridge can be a composite of plastic (e.g., Poly(methyl methacrylate) (PMMA)) and ceramic. It should be understood that ceramic composite is only provided as an example and that the bridge can be made from other materials. As described below, the custom-milled reinforcing bar and custom-milled bridge can be joined or bonded together (e.g., using cement) to form the permanent hybrid denture.

Optionally, in some implementations, the system can further include a 3D face scanner 2206 configured to capture pre-surgical patient data. In some implementations, the system includes a plurality of 3D facial scanners. The 3D facial scanner can capture patient data that includes, but is not limited to, facial profile, high smile line, mid line, and cant of teeth. This disclosure contemplates that such data can be used (e.g., to supplement the 3D scans described above) when designing the hybrid denture. 3D facial scanners are known in the art and therefore not described in detail below. An example 3D facial scanner is the PLANE FINDER System from ZIRKONZAHN of Gais, Italy. It should be understood that the FACE FINDER Scanner is provided only as an example and that other 3D facial scanners can be used with the implementations described herein.

Alternatively or additionally, in some implementations, the 3D scanner(s), 3D facial scanner(s), computing device(s), and/or milling machine(s) can optionally be coupled through one or more communication links. This disclosure contemplates the communication links are any suitable communication link. For example, a communication link may be implemented by any medium that facilitates data exchange between the 3D scanner(s), 3D facial scanner(s), computing device(s), and/or milling machine(s) including, but not limited to, wired, wireless and optical links. Example communication links include, but are not limited to, a LAN, a WAN, a MAN, Ethernet, the Internet, or any other wired or wireless link such as WiFi, WiMax, 3G or 4G.

Example Methods

Figure 19:
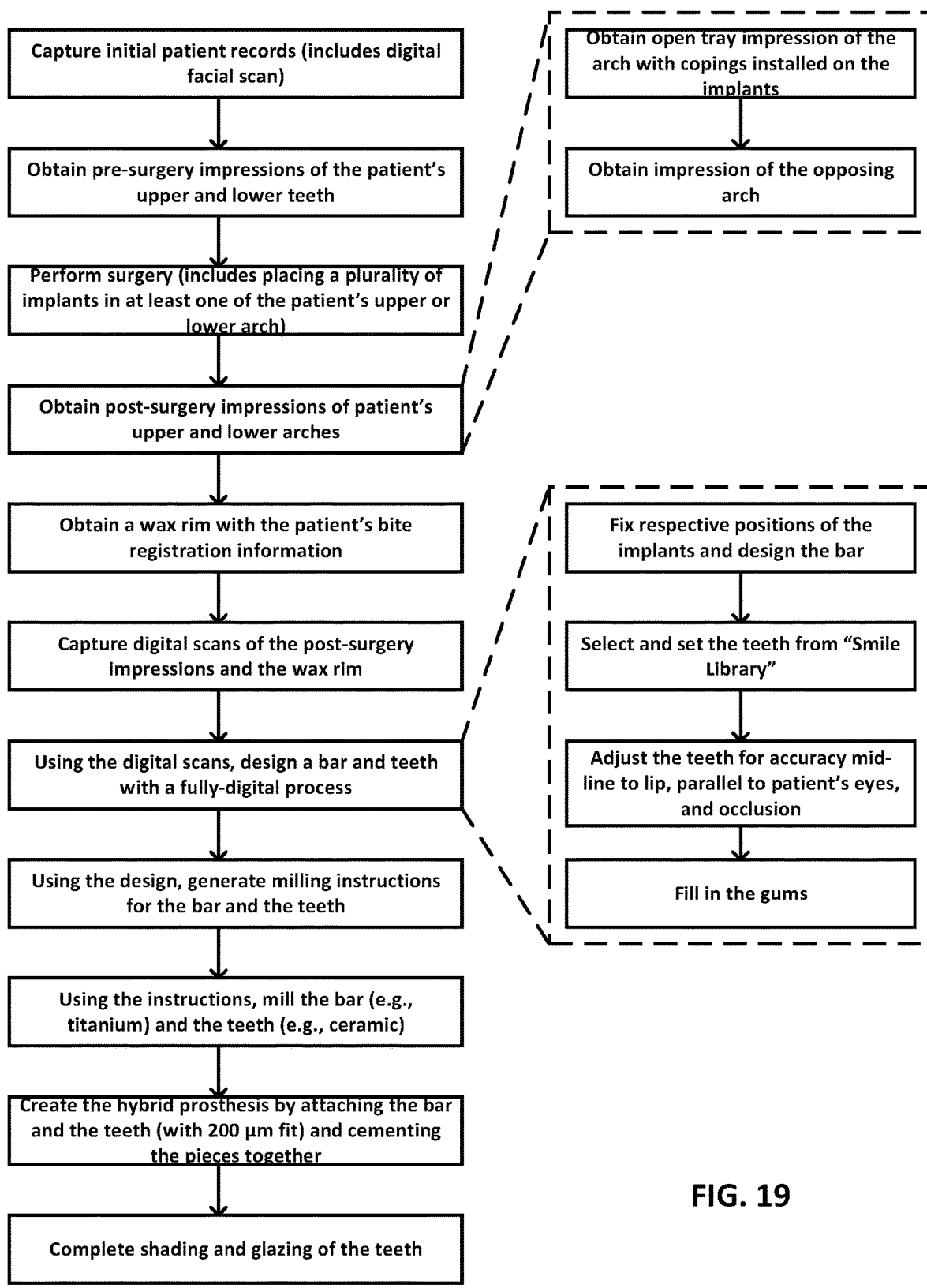
FIG. 19 is a flowchart illustrating an example process for fabricating a permanent hybrid prosthesis according to an implementation described herein.

Referring now to FIG. 19, an example process for fabricating a hybrid prosthesis is shown. The method can include capturing initial patient records such as digital facial scans (e.g., using the 3D facial scanner described above) and/or obtaining pre-surgery impressions of the patient's upper and lower teeth. The initial patient records can include, but are not limited to, vertical dimension, digital face scan, and/or esthetic consultation information (e.g., smile design, tooth shape, tooth size, tooth color, etc.). Optionally, as described below, patient data can include 3D scans of models (e.g., gypsum models) of impressions taken of the patient's upper or lower arch before surgery. These 3D scans can be captured using the 3D scanner described above. The method can also include performing surgery on the patient. During surgery, the surgeon can place one or more implants in at least one of the patient's upper or lower arch. This disclosure contemplates that a plurality of implants can be placed during surgery. For example, six implants can be placed during surgery. It should be understood that more or less than six implants can be placed during surgery. Case-selected surgical trays can be used to ensure both proper prosthetic screw emergence and proper bone reduction. The method can also include obtaining post-surgery impressions of the patient's upper and lower arches. This includes obtaining an open tray impression of the arch with copings installed on the implants, and also obtaining an impression of the opposing arch. This is the final record of implant position. Optionally, the open tray impression can be taken using a custom tray and using the open tray coping with floss and triad technique.

The method can also include obtaining a wax rim with the patient's bite registration information. Additionally, the method can include capturing digital scans of the post-surgery impressions and the wax rim, which can be accomplished using the 3D scanner described above. This can be performed after surgery and optionally after the patient is dismissed by the surgeon. This disclosure contemplates that the hard model can be poured using the post-surgery impressions and/or the scans can be captured in the same or different location as the surgery. When performed off-site, the post-surgery impressions, hard model, and/or wax rim can be shipped to the design facility. Then, the method can include designing the custom bar and bridge from the digital scans using a fully-digital process. A fully-digital process allows the designer to visualize the occlusion and use full anatomical libraries to create a hybrid denture customized to the patient. The accuracy of the anatomy of such a hybrid denture is improved as compared to prosthetic devices formed using conventional techniques and systems. This includes creating a custom tooth model for the patient and also creating a custom reinforcing bar model. An example computer-implemented design process (e.g., fully-digital process) is described below with regard to FIG. 20. The method can also include generating milling instructions for the reinforcing bar and bridge, and using the same to mill the reinforcing bar and the bridge. The method can also include creating the hybrid prosthesis by attaching the reinforcing bar and the bridge and cementing the pieces together. The method can also include shading and/or glazing the teeth and/or gingiva of the bridge before delivering the hybrid prosthesis to the patient. Upon completion, the patient's healing caps are removed and the hybrid prosthesis is installed. The patient's bite can be adjusted and screw access holes can be filled. As described herein, the process of FIG. 19 can be completed within 48 hours (and in some cases within 24 hours) following the patient's surgery.

Figure 20:
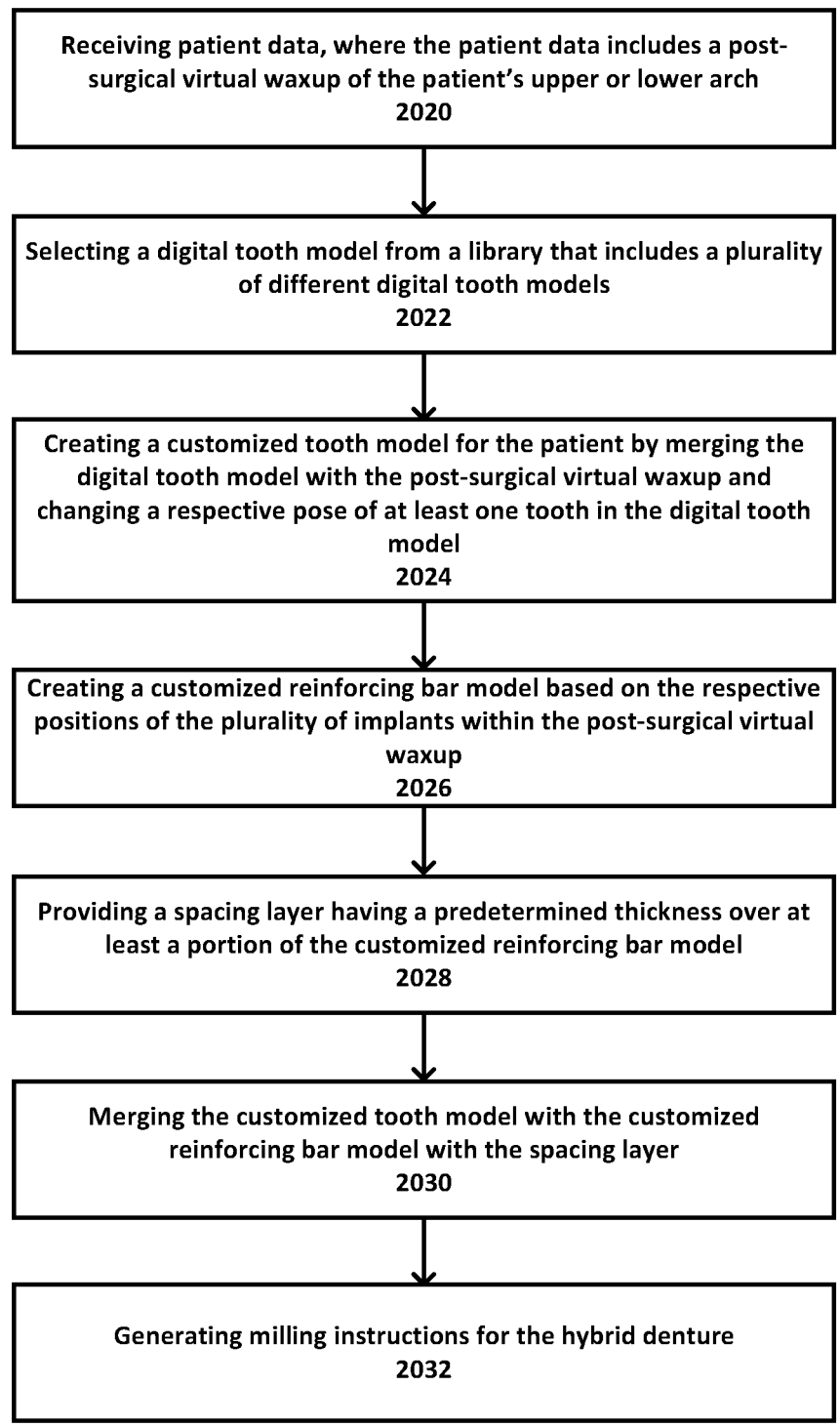
FIG. 20 is a flowchart illustrating an example process for designing a hybrid prosthesis using a fully-digital design process according to an implementation described herein.

Referring now to FIG. 20, an example computer-implemented method for designing a hybrid denture is shown. This disclosure contemplates that the computer-implemented method can be performed using one or more computing devices (e.g., computing device 2100 in FIG. 21) running CAD and CAM software.

Figure 2:
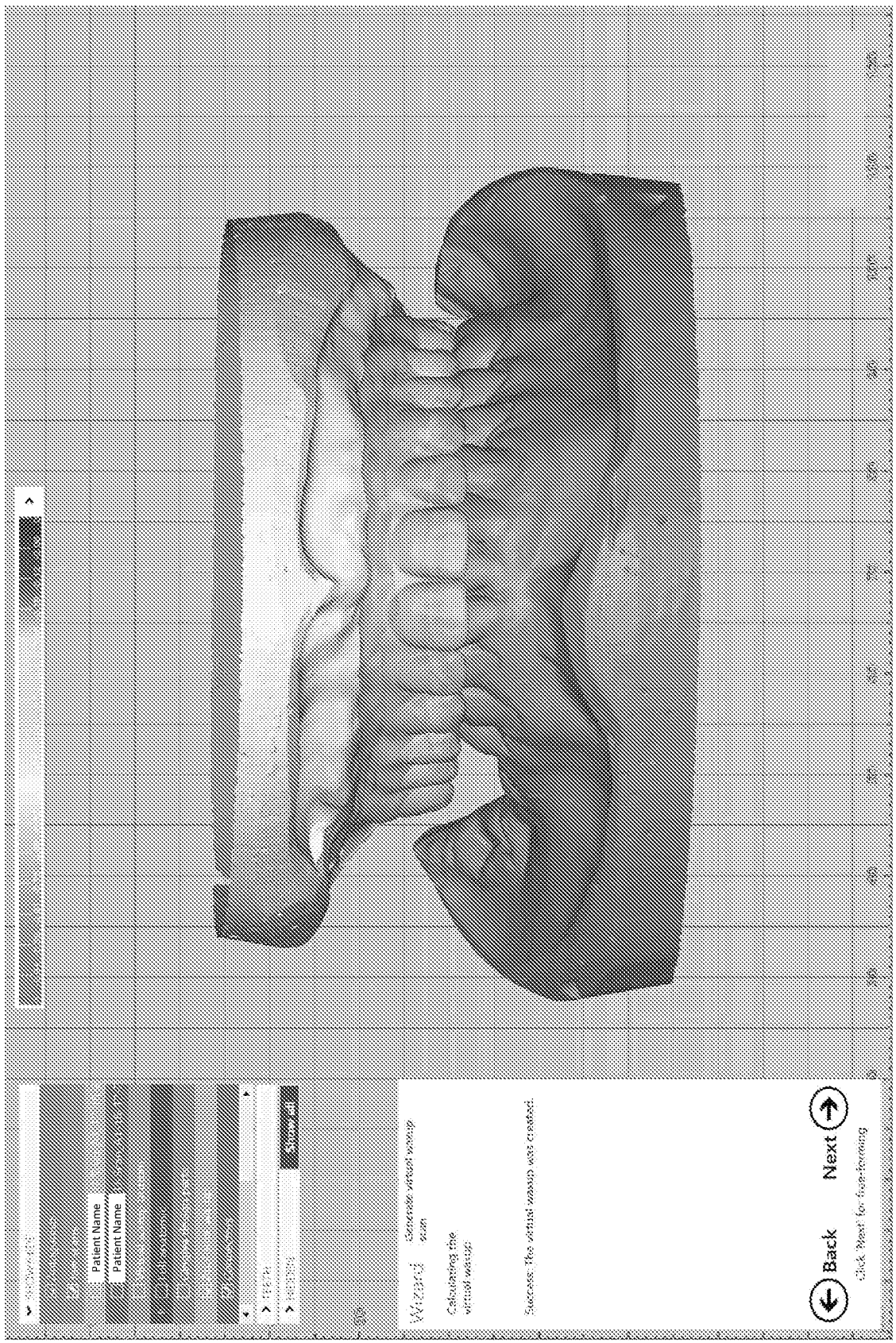
FIG. 2 is an example diagnostic digital anatomic waxup (also sometimes referred to as "post-surgical virtual waxup").
Figure 5:
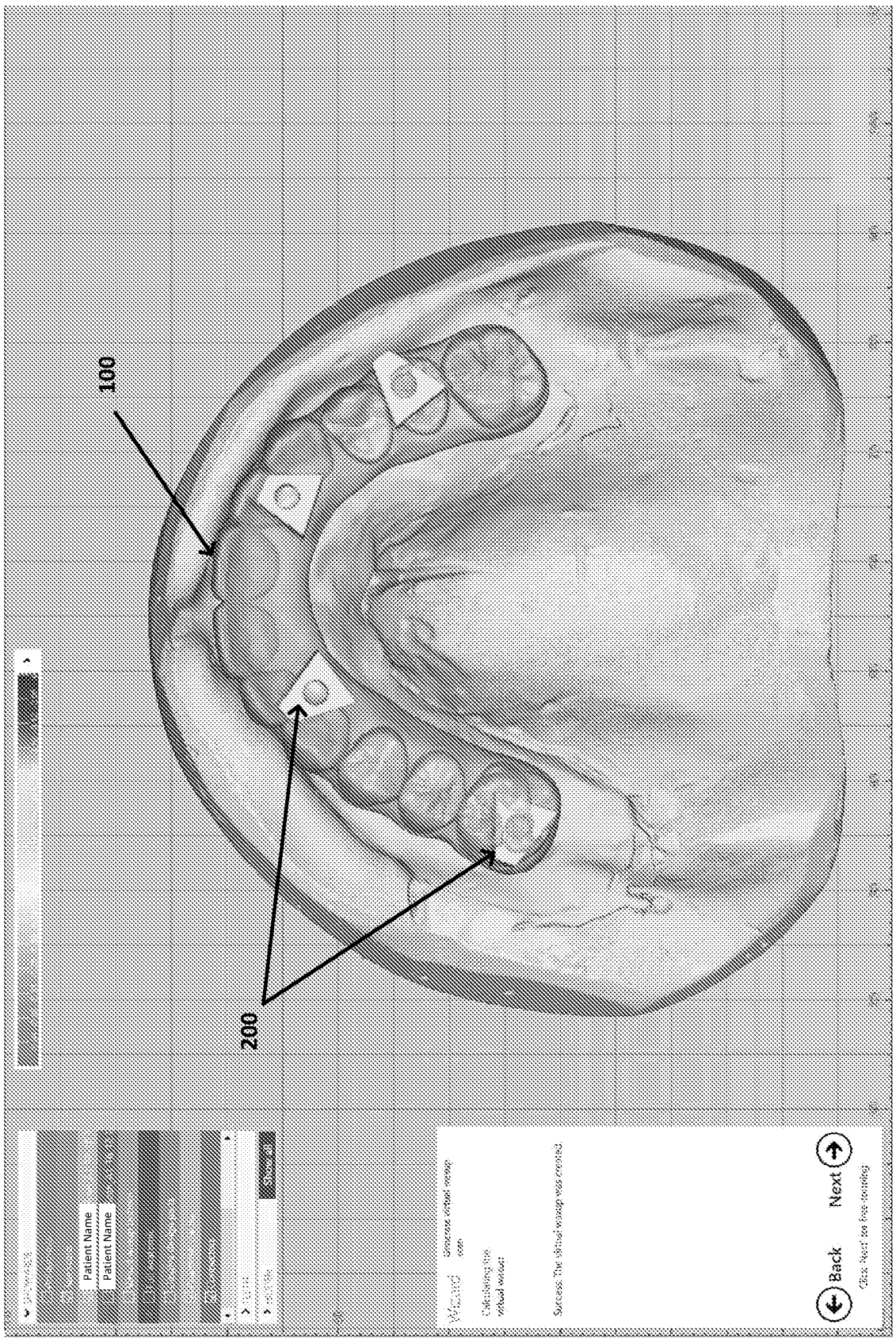
FIG. 5 is another view of the example diagnostic digital anatomic waxup.
Figure 6:
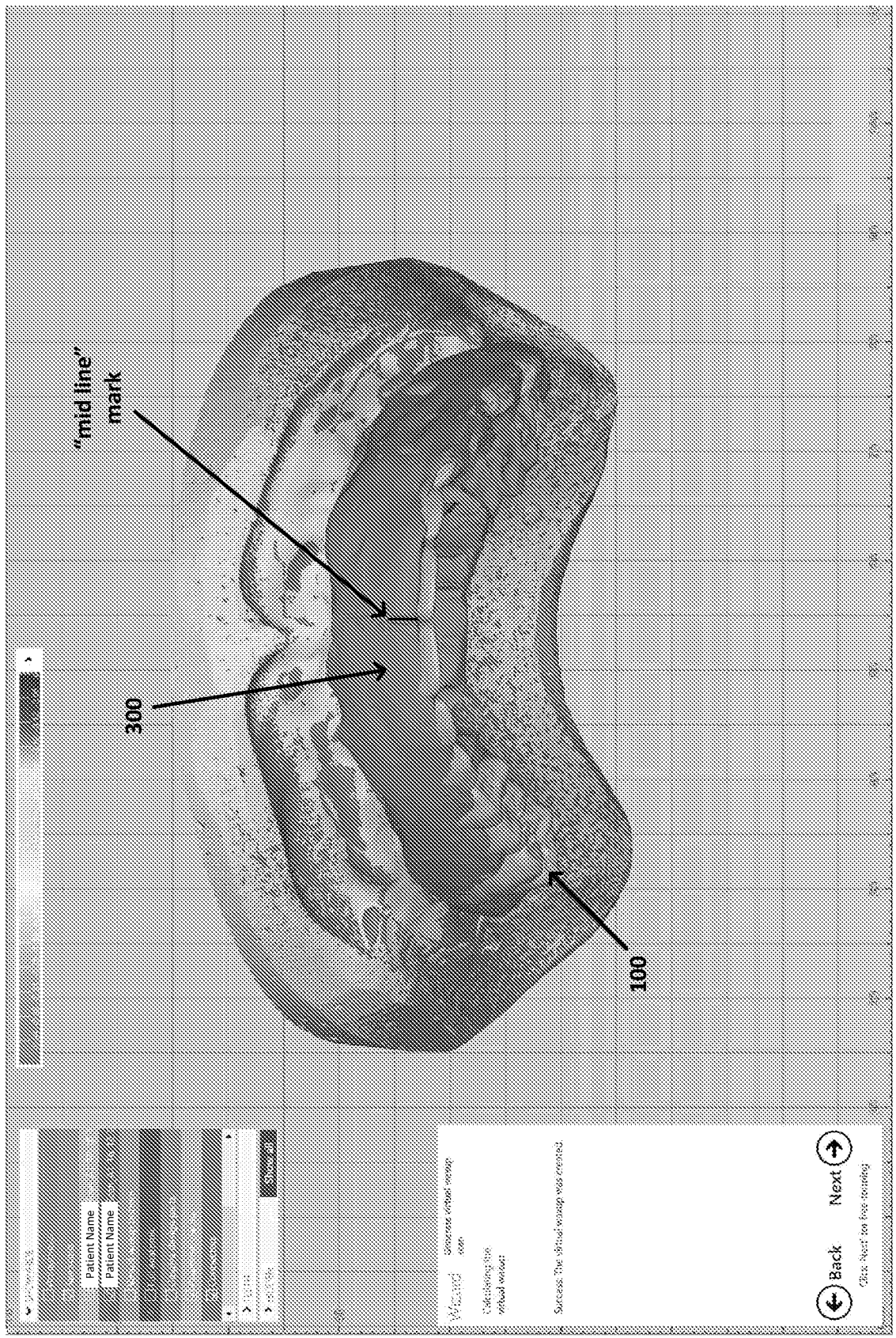
FIG. 6 is another view of the example diagnostic digital anatomic waxup.

At step 2020, the method can include receiving patient data, where the patient data includes a post-surgical virtual waxup (e.g., as shown in FIG. 2) of the patient's upper or lower arch. The method can be used to fabricate a full arch (i.e., a hybrid prosthesis for each of the patient's upper and lower arches). Alternatively, the method can be used to fabricate only one arch (i.e., a hybrid prosthesis for the patient's upper or lower arch only). For simplicity, the method of FIG. 20 is described for design of a single arch (e.g., the patient's upper or lower arch) only. It should be understood that the process can be used to design a full arch as well. The post-surgical virtual waxup can be created from 3D scan data captured by the 3D scanner described above. For example, the post-surgical virtual waxup can be created from 3D scans of various models (e.g., gypsum models) of impressions taken of the patient's upper or lower arch and/or wax bite rims. The impressions can be taken either before or after surgical placement of implants. In some implementations, the following 3D scans are captured: (i) scan of the post-surgical impression model of the patient's upper or lower arch; (ii) scan of the post-surgical impression model of the patient's upper or lower arch with a plurality of implant scan markers installed therein; and (iii) scan of the post-surgical impression model of the patient's upper or lower arch with a wax bite rim applied thereto. The post-surgical virtual waxup can include respective positions of a plurality of implants. For example, the post-surgical impressions can be captured using the dental trays described herein, and the respective positions of the implants within the impressions can be highlighted using the scan markers (e.g., fiducial markers for imaging as shown in FIG. 5). Additionally, the wax bite rim is marked by the dentist or surgeon to provide information about the patient's bite registration (e.g., identify mid line as shown in FIG. 6). Optionally, in some implementations, the patient data can further include 3D scans of models (e.g., gypsum models) of impressions taken of the patient's upper or lower arch before surgery.

Figure 3:
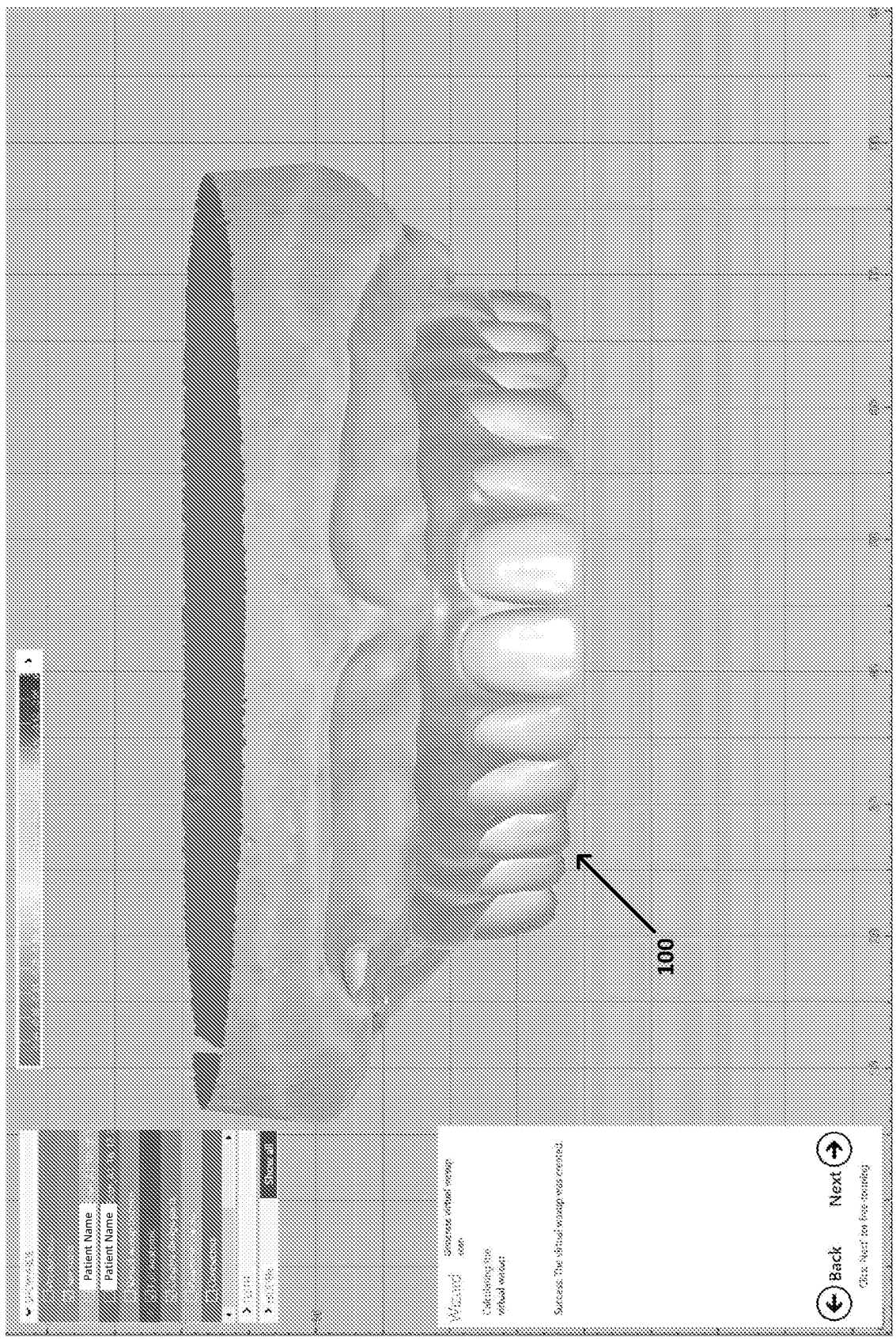
FIG. 3 is another view of the example diagnostic digital anatomic waxup.
Figure 4:
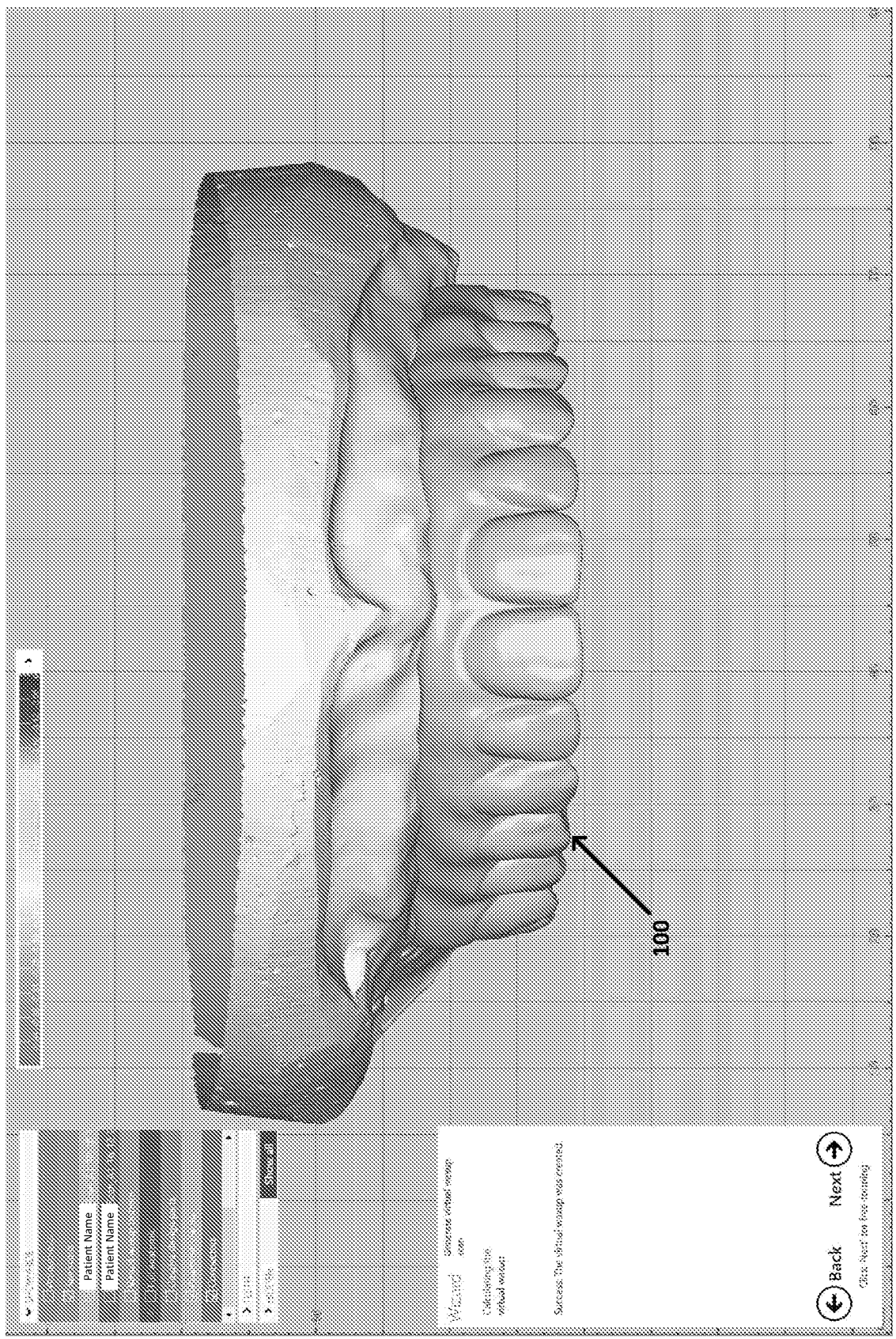
FIG. 4 is another view of the example diagnostic digital anatomic waxup.

At step 2022, the method can include selecting a digital tooth model (e.g., as shown in FIG. 3) from a library. The library can include a plurality of different digital tooth models, each model including a plurality of digital teeth. The library can include a variety of digital tooth models to allow patients/dentists/surgeons to custom match esthetics of the bridge to facial features (e.g., square, square tapered, oval, etc.), age, gender, etc. of an individual patient. In some implementations, the plurality of digital teeth in each tooth model are optionally arranged in an arch-specific relationship. In other words, the pose (e.g., position and orientation) and spacing of the digital teeth are pre-arranged in an orderly manner and stored in memory. The arch-specific relationship serves as an adequate starting point for designing the bridge. And, by pre-arranging the digital teeth in the arch-specific relationship, the time needed to complete the design process is reduced.

Figure 7:
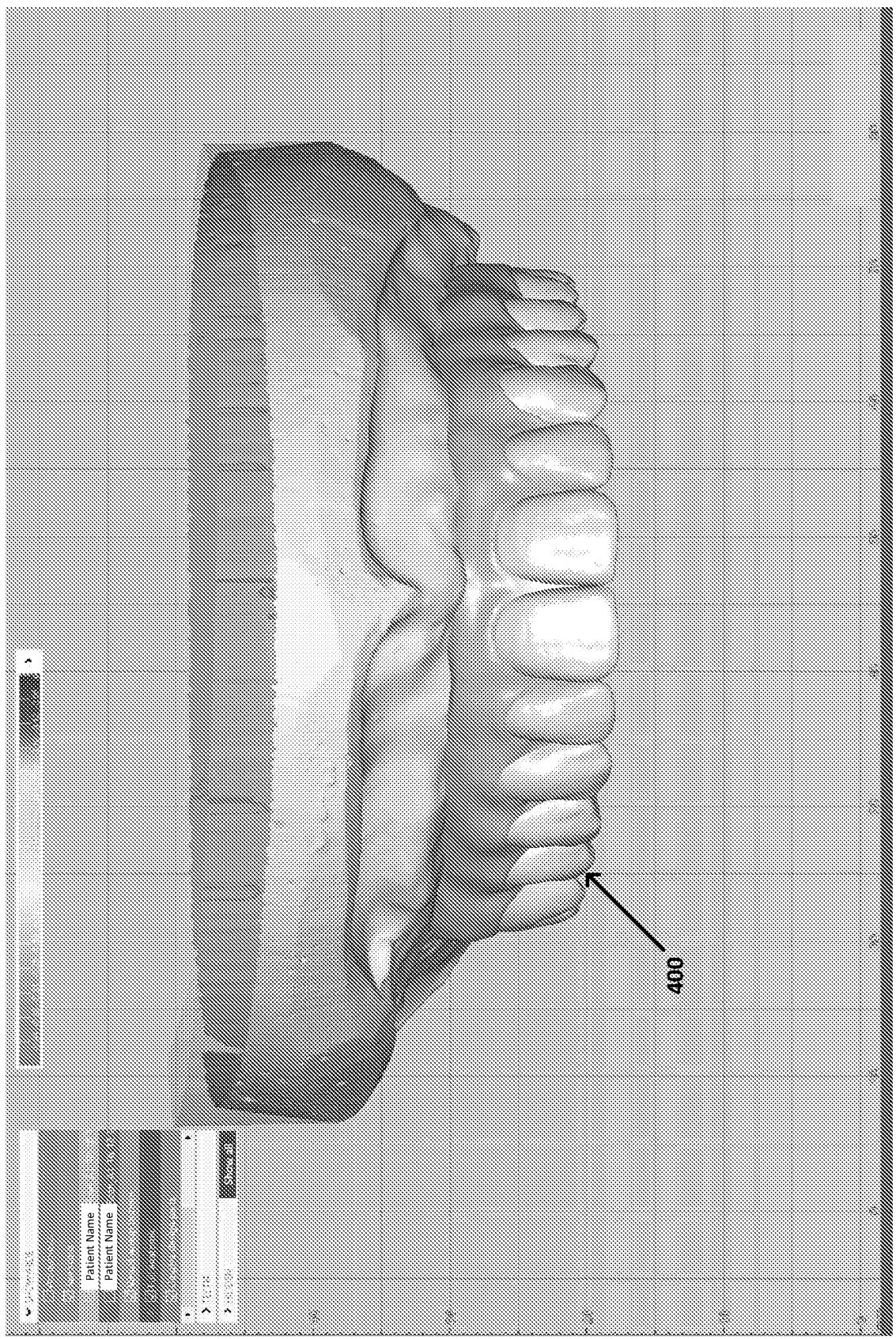
FIG. 7 is another view of the example diagnostic digital anatomic waxup.

At step 2024, the method can include creating a customized tooth model (e.g., as shown in FIGS. 6 and 7) for the patient by merging the digital tooth model with the post-surgical virtual waxup and changing a respective pose of at least one tooth in the digital tooth model. In other words, the tooth model can be customized to the individual patient in this step, for example, to account for the patient's anatomy and/or location of the implants. As described above, the digital tooth model can included digital teeth pre-arranged in an arch-specific relationship. The pose (e.g., position and/or orientation) of one or more of the digital teeth can be altered for either esthetics and/or physical requirements of the individual patient. For example, the pose of one or more digital teeth can be adjusted with respect to the wax bite rim, which provides information about the patient's bite registration (e.g., location of mid line). Additionally, step 2024 can include design of the gingiva of the bridge. Further, in step 2024, the designer considers the desired thickness of the bridge, which will ultimately be milled, and can add material to the tooth model and/or gingiva. It should be understood that the material thickness affects the strength of the bridge. The customized tooth model can be stored (e.g., in memory of computing device 2100 of FIG. 21) for later use (e.g., see step 2030 below).

Figure 8:
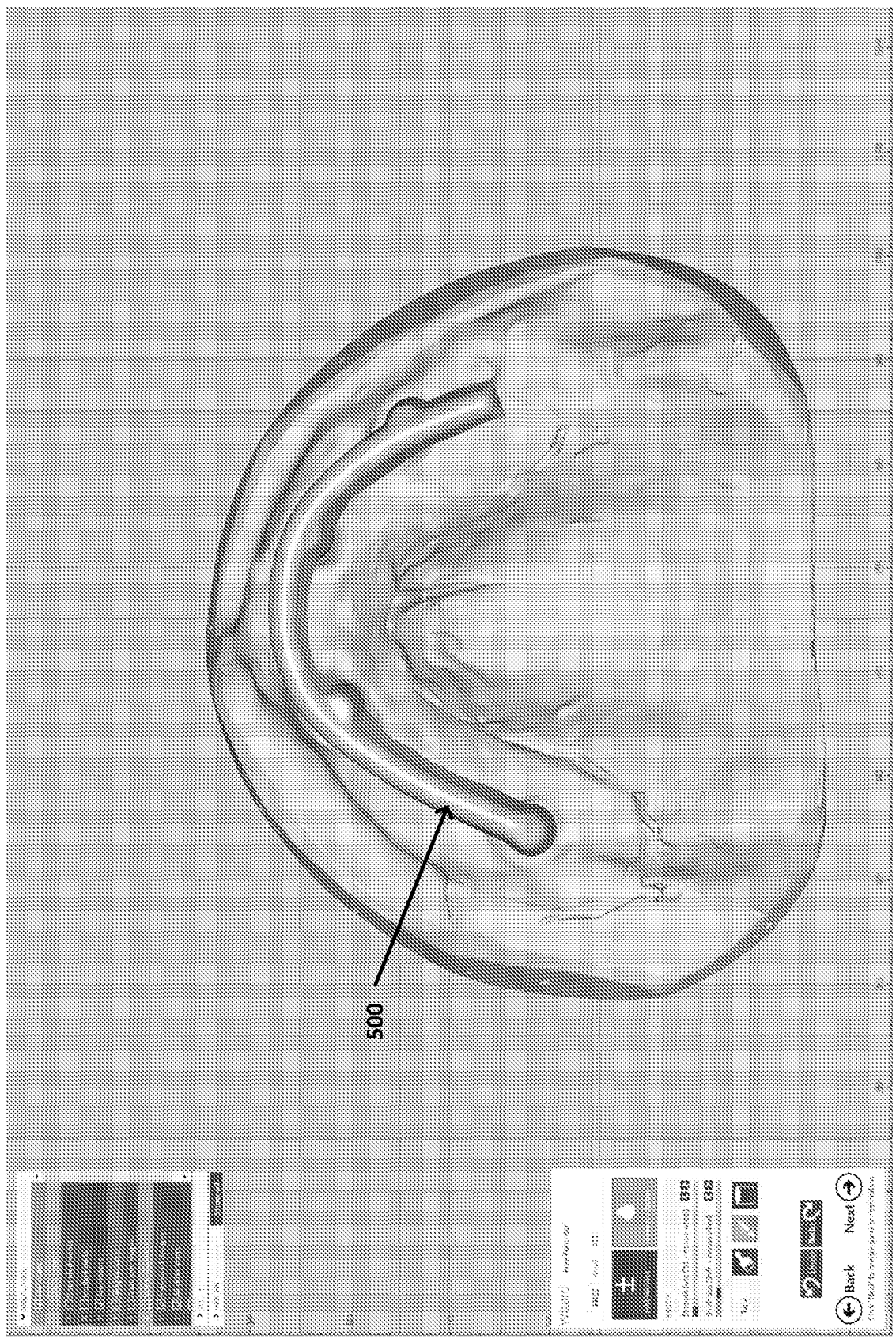
FIG. 8 is a view of the reinforcing bar model 500.
Figure 9:
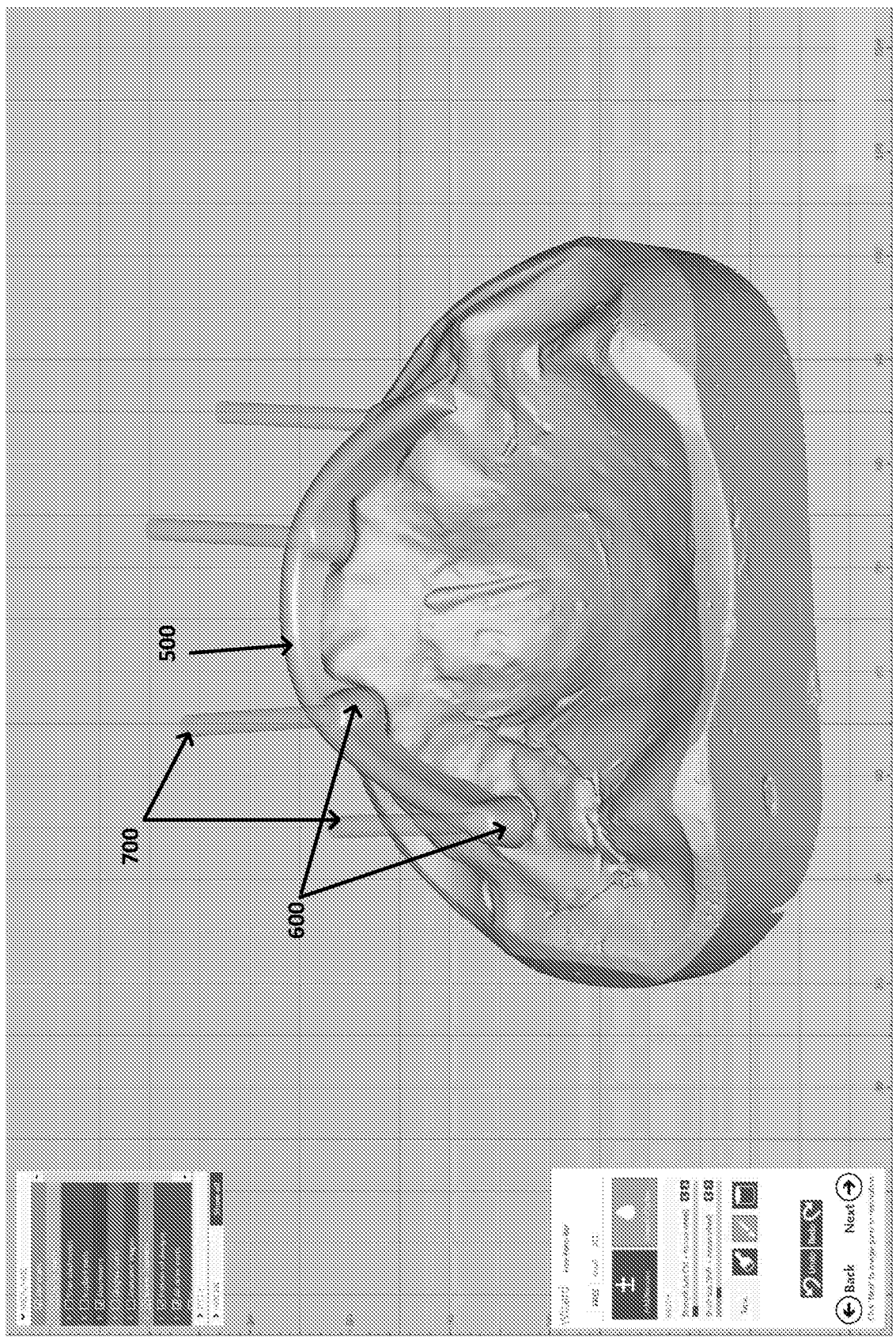
FIG. 9 is another view of the reinforcing bar model 500.
Figure 10:
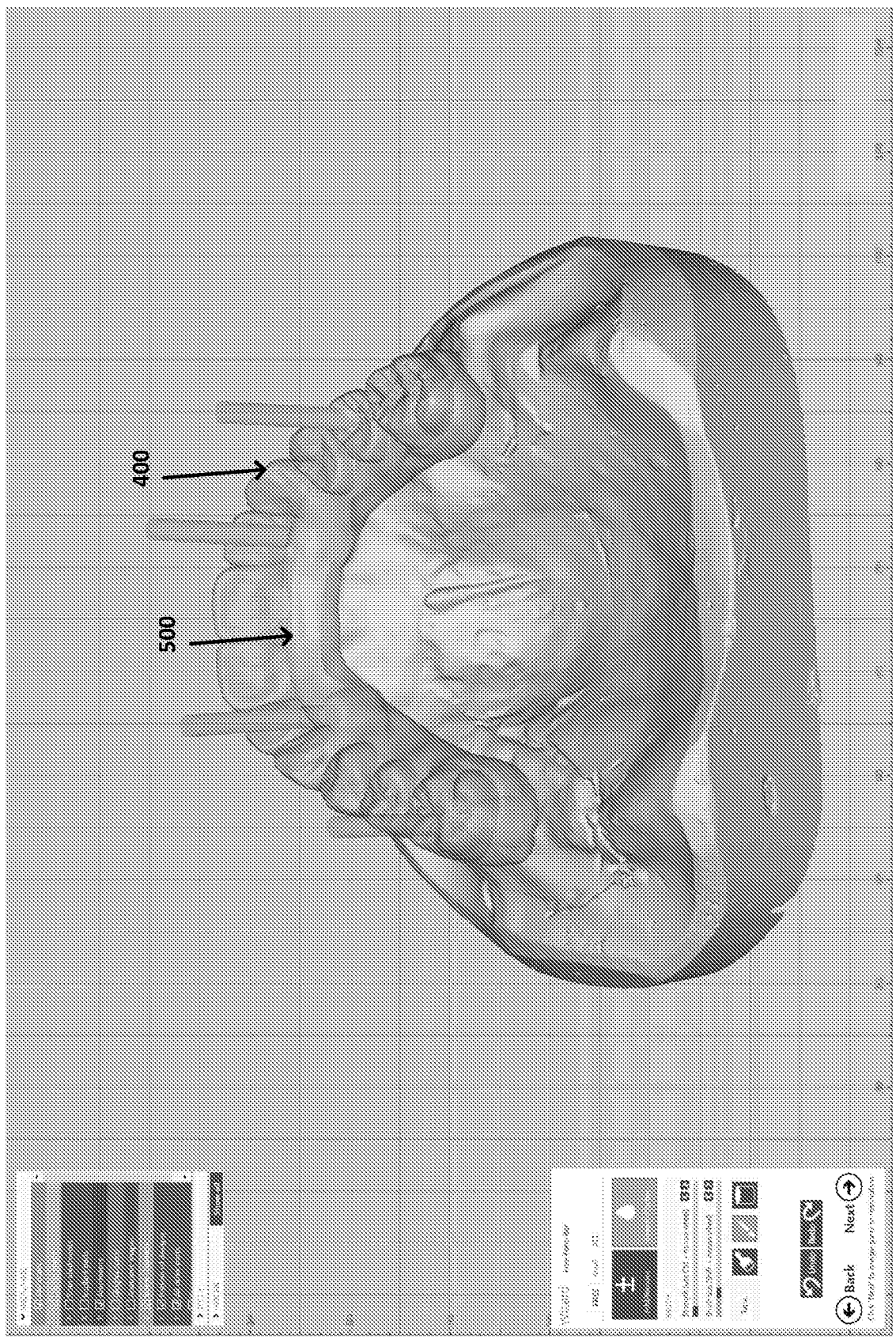
FIG. 10 is another view of the reinforcing bar model.
Figure 11:
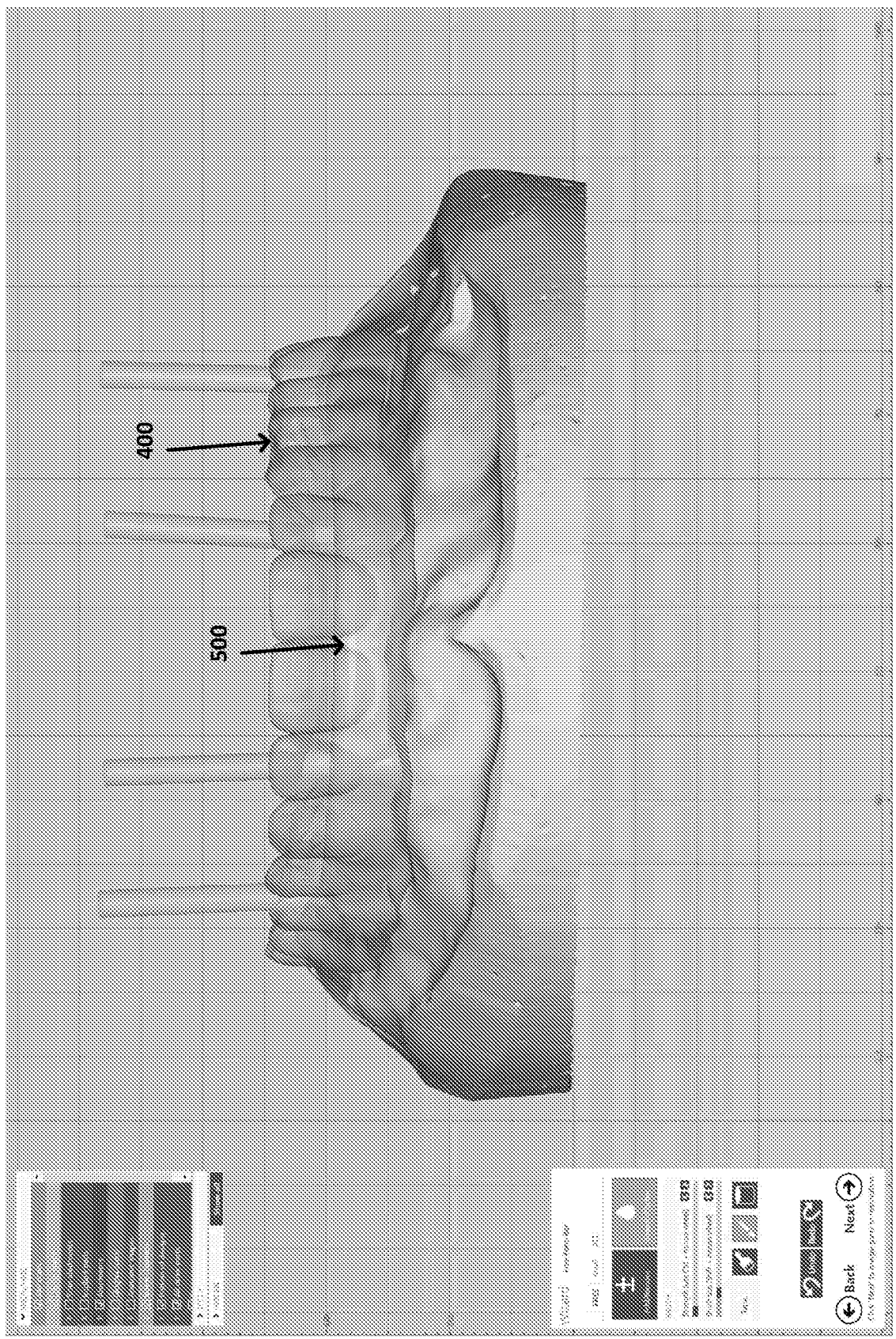
FIG. 11 is another view of the reinforcing bar model shown in FIG. 10.
Figure 12:
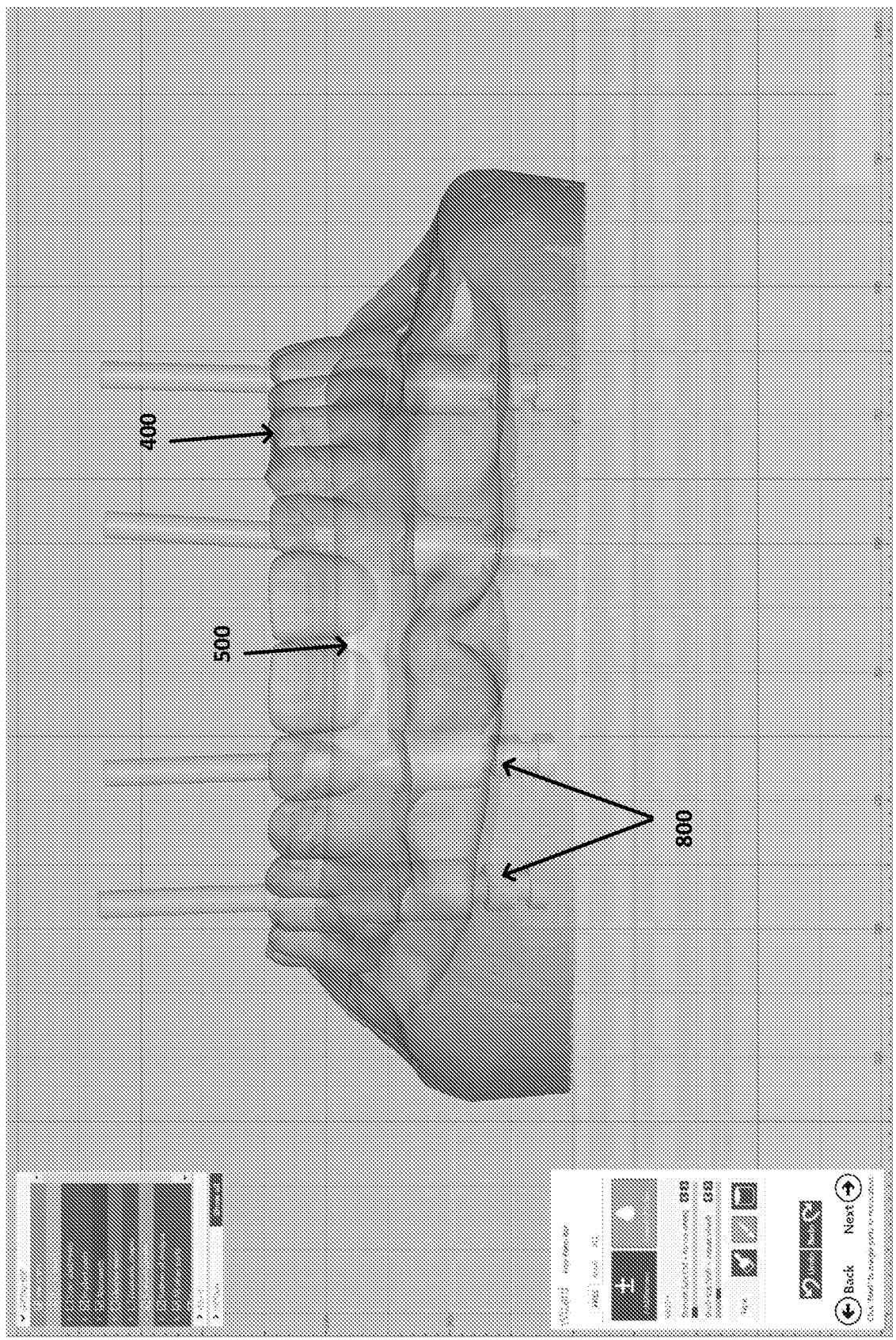
FIG. 12 is another view of the reinforcing bar model shown in FIG. 10.

At 2026, the method can include creating a customized reinforcing bar model (e.g., as shown in FIG. 8) based on the respective positions of the plurality of implants within the post-surgical virtual waxup. The post-surgical virtual waxup captures both the patient's anatomy, as well as the locations of the implants. Thus, the reinforcing bar model can be custom designed based both on the patient's anatomy and the locations of the implants. For example, the reinforcing bar parameters including, but not limited to, dimensions (e.g., height, width, length, etc.), shape, thickness, etc. can be designed as an overlay on the post-surgical virtual waxup. Additionally, using the CAD software, virtual implants (e.g., as shown in FIG. 12) can be applied to the post-surgical virtual waxup such that the pillars (e.g., portion of the reinforcing bar accepting the screws as shown in FIGS. 9-12) can be designed at appropriate locations. Further, in step 2026, the designer considers the desired thickness of the reinforcing bar, which will ultimately be milled, and can add material to the reinforcing bar model. It should be understood that the material thickness affects the strength of the reinforcing bar.

Figure 13:
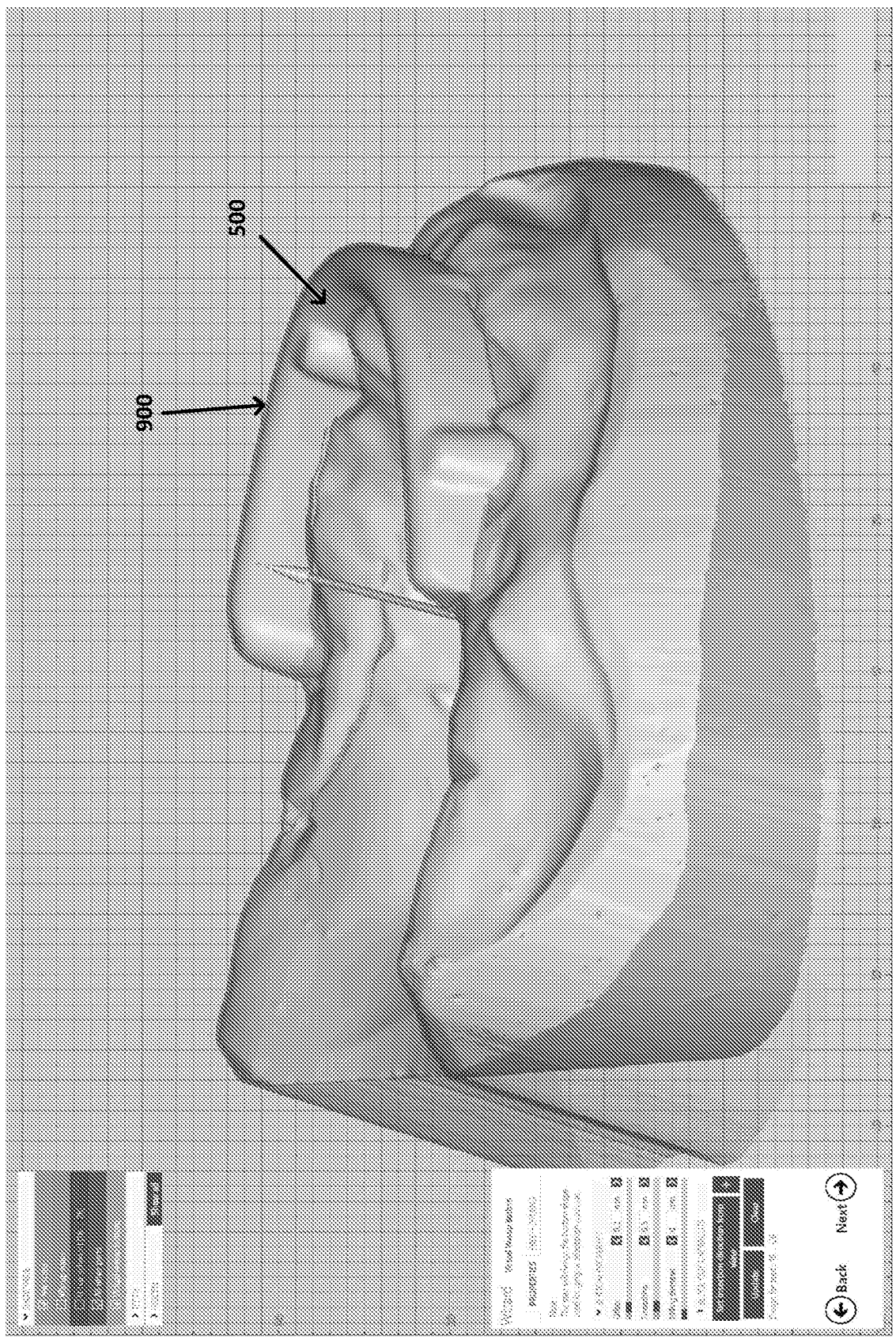
FIG. 13 is another view of the reinforcing bar model.
Figure 14:
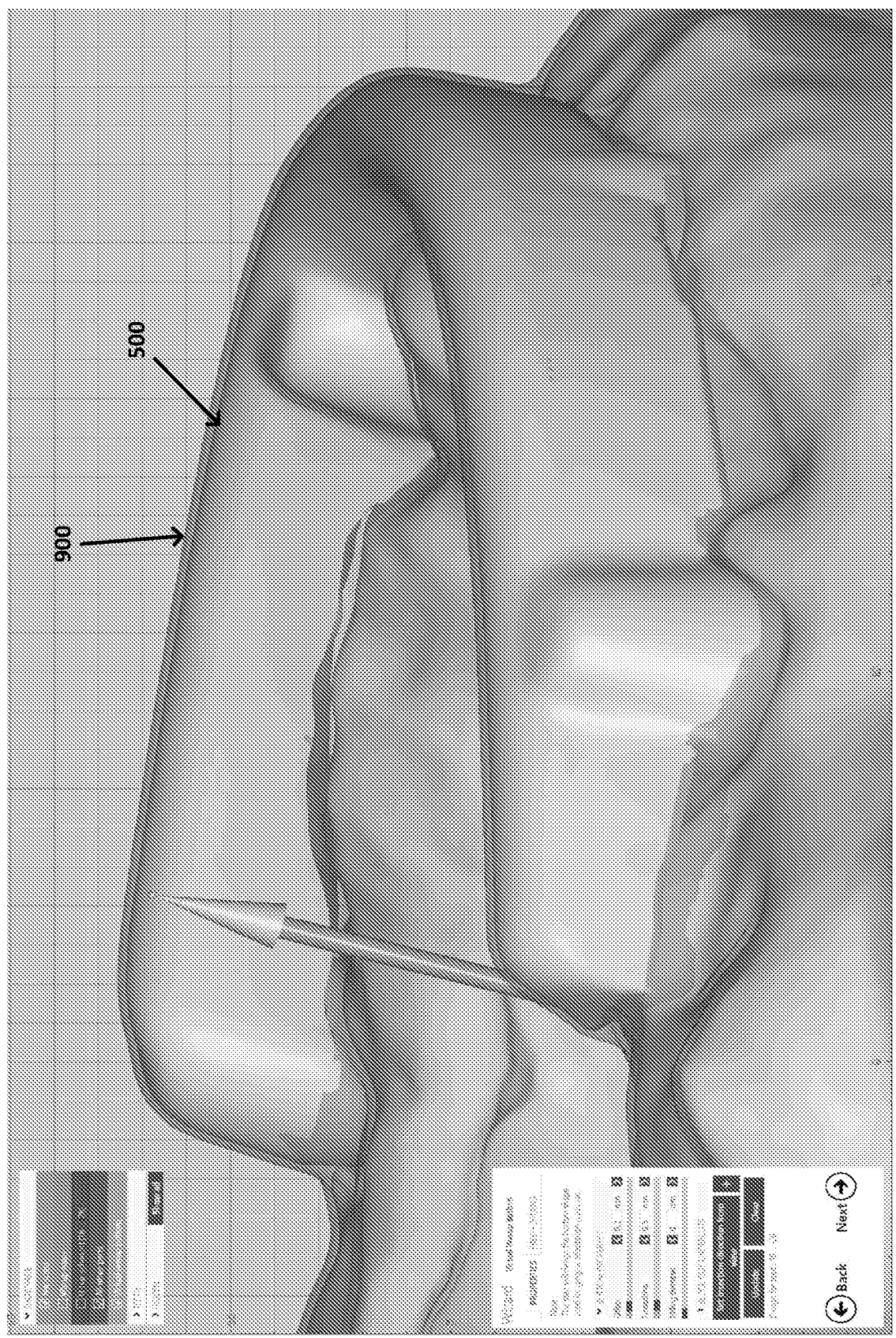
FIG. 14 is another view of the reinforcing bar model shown in FIG. 13.
Figure 15:
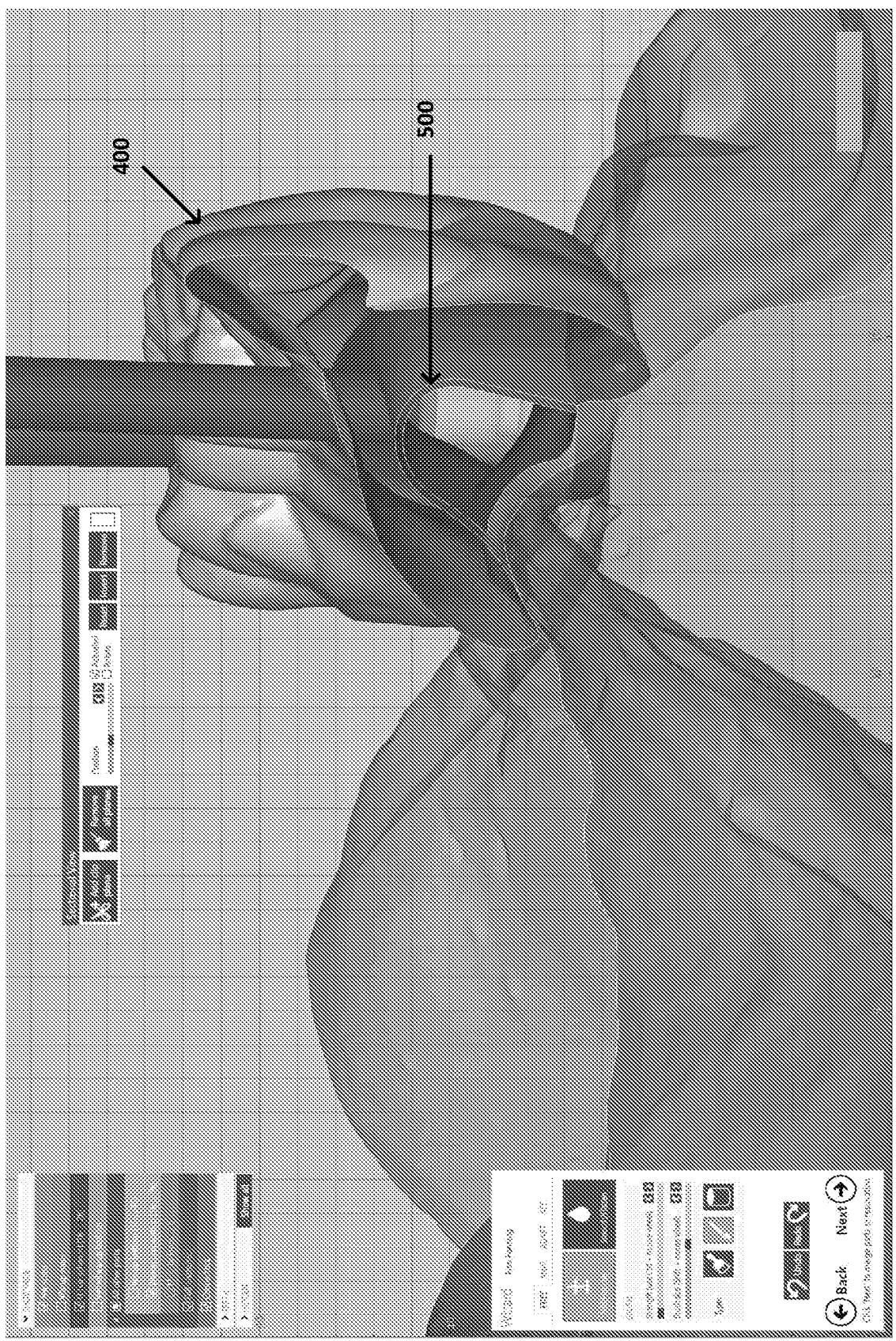
FIG. 15 is another view of the reinforcing bar model shown in FIG. 13.
Figure 16:
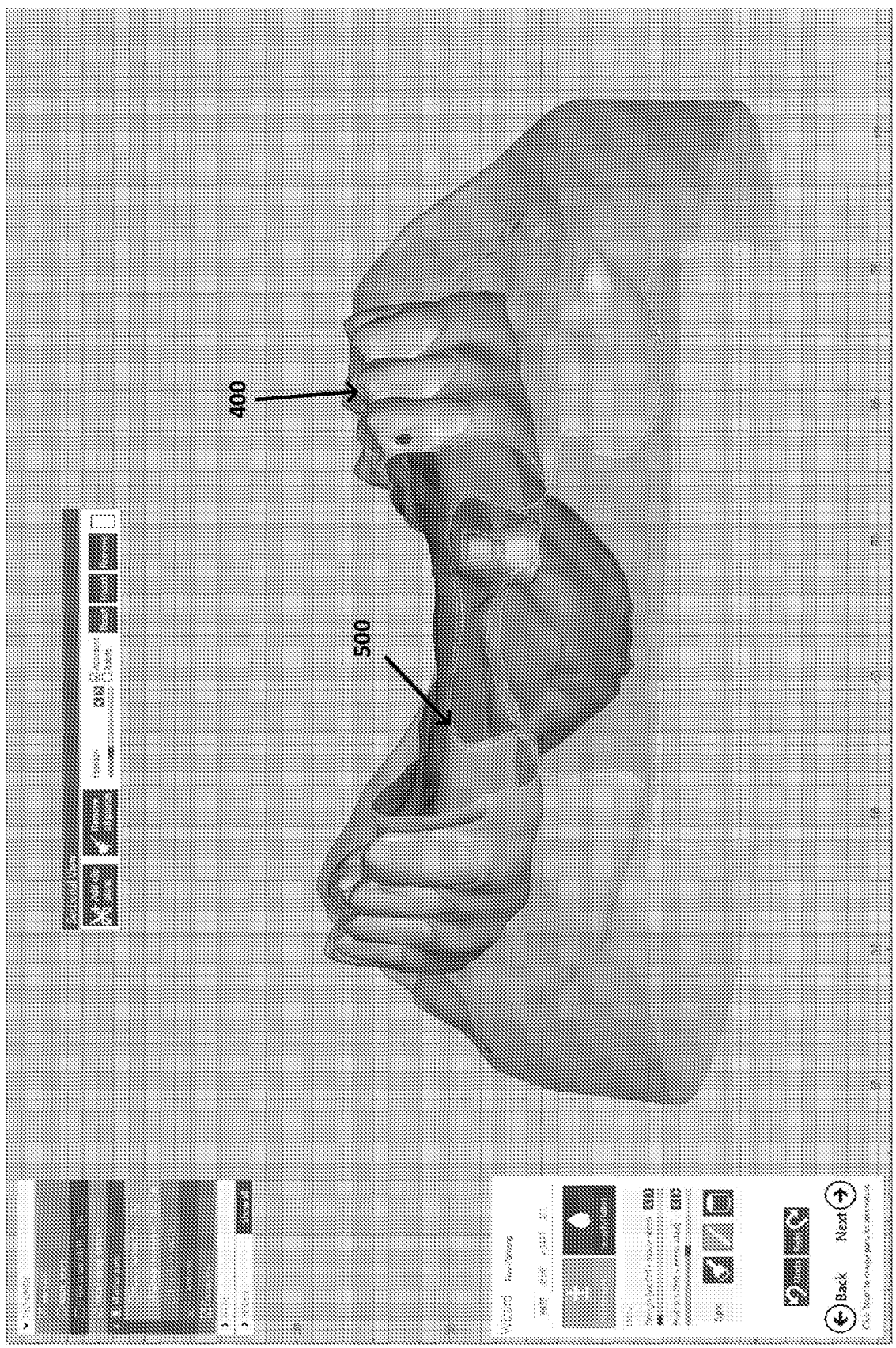
FIG. 16 is another view of the reinforcing bar model shown in FIG. 15.
Figure 17:
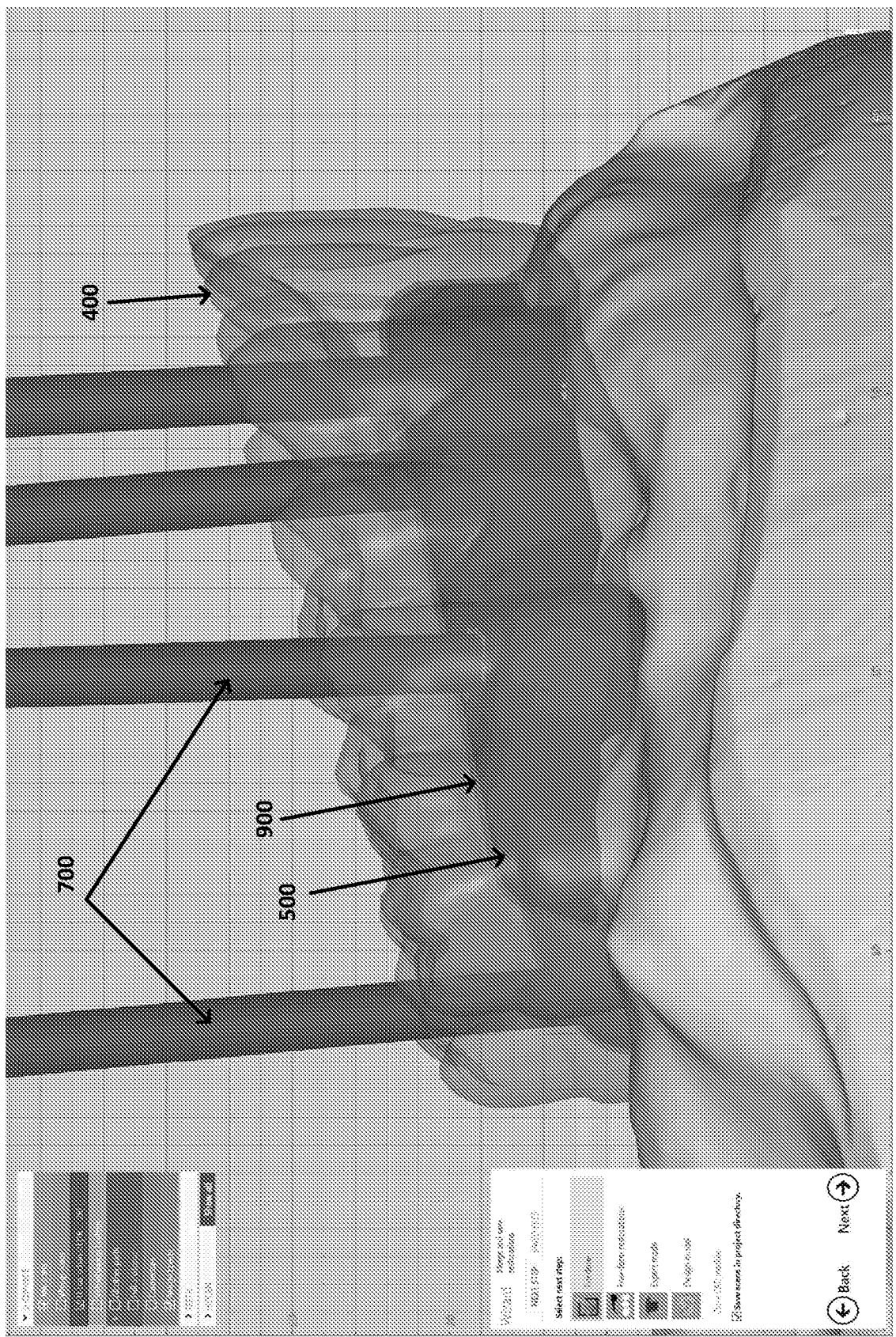
FIG. 17 is another view of the reinforcing bar model merged with the custom tooth model shown in FIG. 15.
Figure 18A:
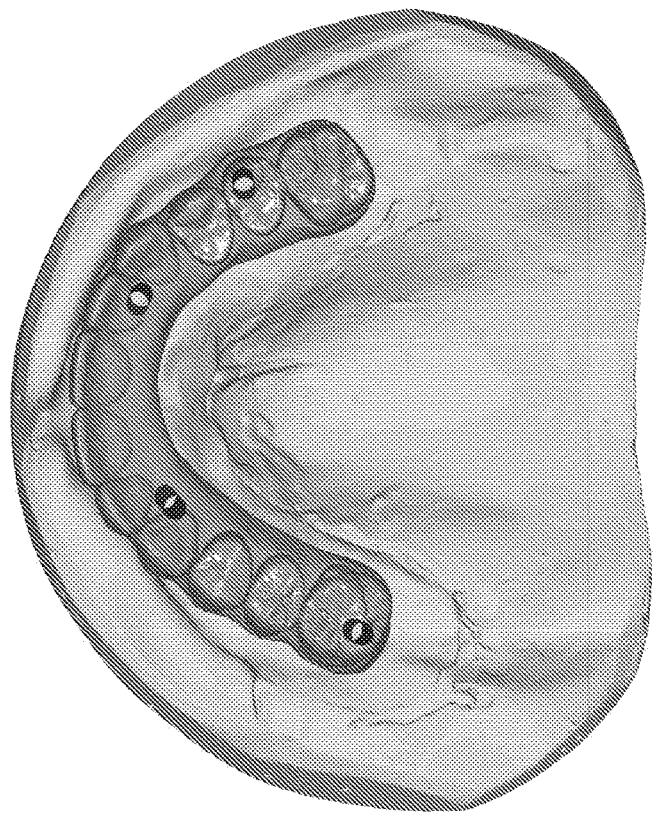
FIGS. 18A-18B a 3D view (FIG. 18A) and various two-dimensional views (FIG. 18B) of an example custom tooth model merged with a custom reinforcing bar model according to an implementation described herein.
Figure 18A:
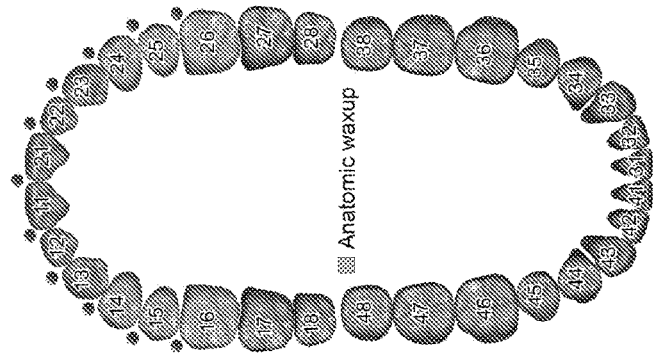
Figure 18B:
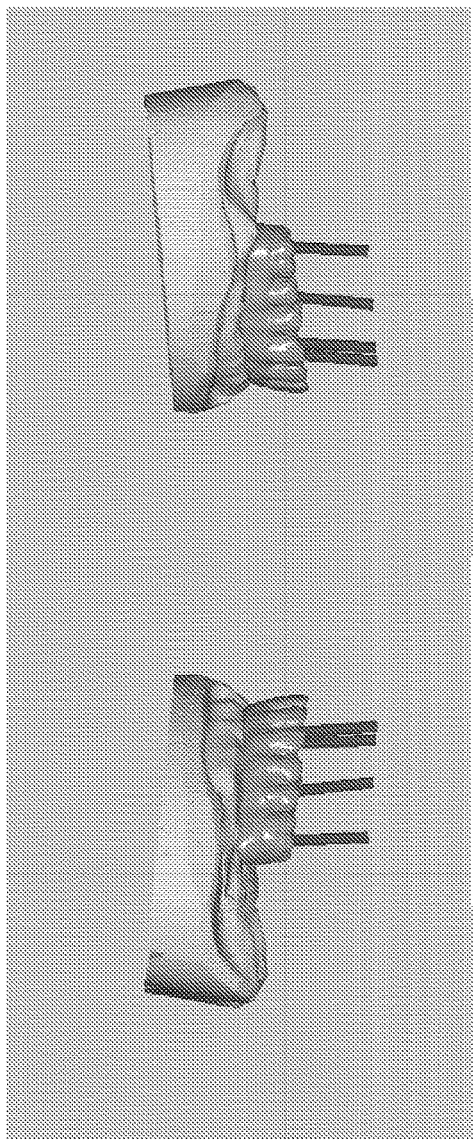
Figure 18B:
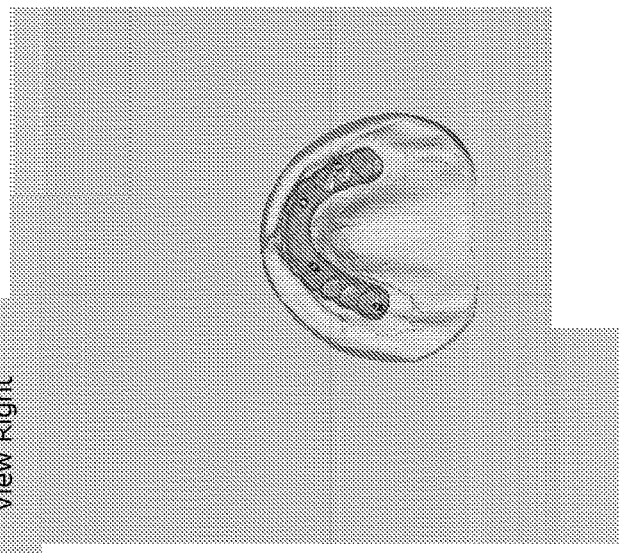
Figure 18B:
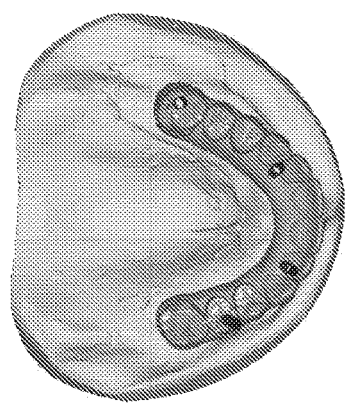
Figure 18B:
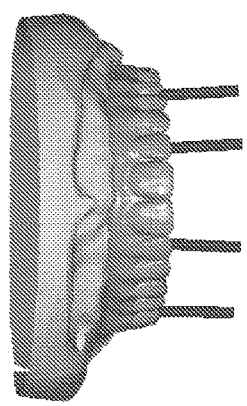
Figure 18B:
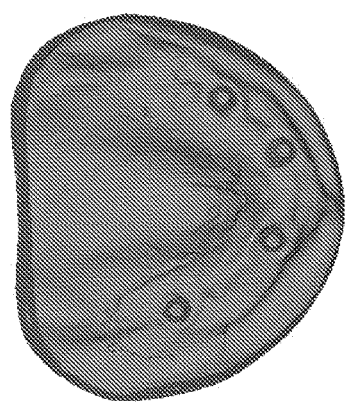

At 2028, the method can include providing a spacing layer (e.g., as shown in FIGS. 13, 14, and 17) having a predetermined thickness over at least a portion of the customized reinforcing bar model. In FIGS. 13, 14, and 17, the spacing layer is provided over the entire surface of the customized reinforcing bar model. The spacing layer is an overlay having a predetermined thickness. The spacing layer adds a "tolerance" (e.g., between about 0.2 and 0.5 mm) to the customized reinforcing bar model. In some implementations, the predetermined thickness is between about 0.2 mm and about 0.5 mm. This spacing ensures proper fit between custom-milled reinforcing bar and the custom-milled bridge such that the hybrid denture is substantially perfect mid-line to lip, with the teeth of bridge substantially parallel to the eyes, and with substantially perfect occlusion. In other words, this spacing ensure that the custom-milled reinforcing bar and bridge can be cemented together and then secured to the implants located in the patient's mouth such that the hybrid denture is properly placed without need for adjustments, which reduces both chair-time and/or office visits. Predetermined thicknesses greater than about 0.5 mm and less than about 0.2 mm have been found to require manual adjustment or retrofit after milling to ensure proper fit between custom-milled reinforcing bar and the custom-milled bridge. Accordingly, providing the spacing layer with thickness between about 0.2 mm and 0.5 mm has advantages including, but not limited to, facilitating fully-digital design of the hybrid denture. For example, a predetermined thickness of about 0.2 mm has been found to facilitate fabrication of the hybrid denture within 24 hours following surgery. Alternatively or additionally, in some implementations, the predetermined thickness can optionally be less than 0.5 mm. Alternatively or additionally, in some implementations, the predetermined thickness can optionally be less than 0.4 mm. Alternatively or additionally, in some implementations, the predetermined thickness can optionally be less than 0.3 mm.

At 2030, the method can include merging the customized tooth model with the customized reinforcing bar model with the spacing layer (e.g., as shown in FIG. 17). Optionally, in some implementations, this step can include creating a plurality of fastener channels corresponding to each of the plurality of implants in the customized tooth model and the customized reinforcing bar model. This can be accomplished by applying virtual implants, as well as virtual extensions showing trajectory of the fasteners (e.g., screws) into the implants (e.g., as shown in FIG. 17). Accordingly, the design can include providing fastener channels in appropriate locations and with appropriate trajectory.

At 2032, the method can include generating milling instructions for the hybrid denture. Milling instructions for the customized reinforcing bar can be generated based on the reinforcing bar model without the spacing layer. Milling instructions for the customized bridge can be generated based on the custom teeth model, which can include a channel for receiving the reinforcing bar and corresponding to the size/shape of the reinforcing bar model with the spacing layer. In this way, the custom-milled bar and the custom-milled bridge are fabricated with a tolerance there between about equal to the predetermined thickness (e.g., about 0.2 mm in some implementations). As discussed above in step 2028, this tolerance ensures proper fit between custom-milled reinforcing bar and the custom-milled bridge such that the hybrid denture is substantially perfect mid-line to lip, with the teeth of bridge substantially parallel to the eyes, and with substantially perfect occlusion. Using the milling instructions, the customized reinforcing bar and the customized bridge can be milled from titanium (or other suitable material) and ceramic composite (or other suitable material), respectively, using the milling machine(s) described above. After milling and optionally shading/glazing for esthetics, the customized reinforcing bar and the customized bridge can be joined together (e.g., using cement) to form the hybrid denture, which can subsequently be delivered to the patient. In some implementations, the permanent hybrid denture is delivered to the patient within 48 hours (and in some cases within 24 hours) following the patient's surgery.

The systems and methods described herein provide advantages including, but not limited to, the following as compared to conventional hybrid denture fabrication. The systems and methods described herein improve efficiency and/or save time. For example, chair time (e.g., patient contact time) using conventional processes is typically about 15 hours for surgery, installation/adjustments to the temporary denture, and installation/adjustments to the permanent denture. In contrast, chair time using the systems and methods described herein is typically about 3 hours for surgery and installation/adjustment to the permanent hybrid denture. This is a substantial reduction in patient contact time, which frees up the dental professional(s) and/or facilitates the treatment of more patients. The systems and methods described herein also require fewer patient visits. For example, conventional processes require numerous visits over a period of 6-8 months, which include removal of the temporary and permanent dentures 5 or more times. This also includes endless visits and temporary denture adjustments over the course of treatment before delivery of the final, permanent denture. In contrast, the systems and methods described herein facilitate surgery, delivery, and adjustment of the permanent hybrid denture in a 24-48 hour period. The permanent hybrid denture is then typically removed only one time during a check-up about 3 months after surgery.

Example Computing Device

It should be appreciated that the logical operations described herein with respect to the various figures may be implemented (1) as a sequence of computer implemented acts or program modules (i.e., software) running on a computing device (e.g., the computing device described in FIG. 21), (2) as interconnected machine logic circuits or circuit modules (i.e., hardware) within the computing device and/or (3) a combination of software and hardware of the computing device. Thus, the logical operations discussed herein are not limited to any specific combination of hardware and software. The implementation is a matter of choice dependent on the performance and other requirements of the computing device. Accordingly, the logical operations described herein are referred to variously as operations, structural devices, acts, or modules. These operations, structural devices, acts and modules may be implemented in software, in firmware, in special purpose digital logic, and any combination thereof. It should also be appreciated that more or fewer operations may be performed than shown in the figures and described herein. These operations may also be performed in a different order than those described herein.

Figure 21:
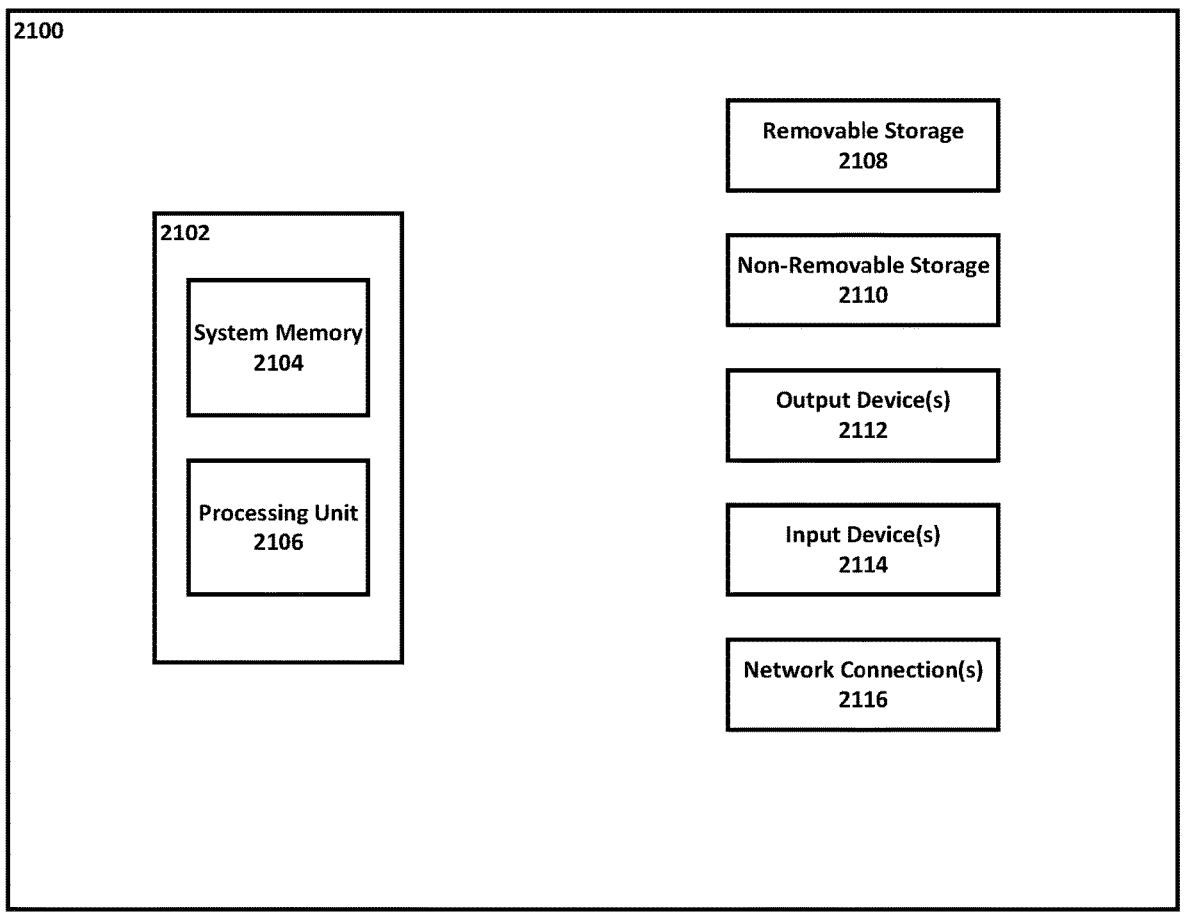
FIG. 21 is a block diagram illustrating an example computing device.

Referring to FIG. 21, an example computing device 2100 upon which embodiments of the invention may be implemented is illustrated. It should be understood that the example computing device 2100 is only one example of a suitable computing environment upon which embodiments of the invention may be implemented. Optionally, the computing device 2100 can be a well-known computing system including, but not limited to, personal computers, servers, handheld or laptop devices, multiprocessor systems, microprocessor-based systems, network personal computers (PCs), minicomputers, mainframe computers, embedded systems, and/or distributed computing environments including a plurality of any of the above systems or devices. Distributed computing environments enable remote computing devices, which are connected to a communication network or other data transmission medium, to perform various tasks. In the distributed computing environment, the program modules, applications, and other data may be stored on local and/or remote computer storage media.

In its most basic configuration, computing device 2100 typically includes at least one processing unit 2106 and system memory 2104. Depending on the exact configuration and type of computing device, system memory 2104 may be volatile (such as random access memory (RAM)), non-volatile (such as read-only memory (ROM), flash memory, etc.), or some combination of the two. This most basic configuration is illustrated in FIG. 21 by dashed line 2102. The processing unit 2106 may be a standard programmable processor that performs arithmetic and logic operations necessary for operation of the computing device 2100. The computing device 2100 may also include a bus or other communication mechanism for communicating information among various components of the computing device 2100.

Computing device 2100 may have additional features/functionality. For example, computing device 2100 may include additional storage such as removable storage 2108 and non-removable storage 2110 including, but not limited to, magnetic or optical disks or tapes. Computing device 2100 may also contain network connection(s) 2116 that allow the device to communicate with other devices. Computing device 2100 may also have input device(s) 2114 such as a keyboard, mouse, touch screen, etc. Output device(s) 2112 such as a display, speakers, printer, etc. may also be included. The additional devices may be connected to the bus in order to facilitate communication of data among the components of the computing device 2100. All these devices are well known in the art and need not be discussed at length here.

The processing unit 2106 may be configured to execute program code encoded in tangible, computer-readable media. Tangible, computer-readable media refers to any media that is capable of providing data that causes the computing device 2100 (i.e., a machine) to operate in a particular fashion. Various computer-readable media may be utilized to provide instructions to the processing unit 2106 for execution. Example tangible, computer-readable media may include, but is not limited to, volatile media, non-volatile media, removable media and non-removable media implemented in any method or technology for storage of information such as computer readable instructions, data structures, program modules or other data. System memory 2104, removable storage 2108, and non-removable storage 2110 are all examples of tangible, computer storage media. Example tangible, computer-readable recording media include, but are not limited to, an integrated circuit (e.g., field-programmable gate array or application-specific IC), a hard disk, an optical disk, a magneto-optical disk, a floppy disk, a magnetic tape, a holographic storage medium, a solid-state device, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices.

In an example implementation, the processing unit 2106 may execute program code stored in the system memory 2104. For example, the bus may carry data to the system memory 2104, from which the processing unit 2106 receives and executes instructions. The data received by the system memory 2104 may optionally be stored on the removable storage 2108 or the non-removable storage 2110 before or after execution by the processing unit 2106.

It should be understood that the various techniques described herein may be implemented in connection with hardware or software or, where appropriate, with a combination thereof. Thus, the methods and apparatuses of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computing device, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an application programming interface (API), reusable controls, or the like. Such programs may be implemented in a high level procedural or object-oriented programming language to communicate with a computer system. However, the program(s) can be implemented in assembly or machine language, if desired. In any case, the language may be a compiled or interpreted language and it may be combined with hardware implementations.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A system for fabricating a hybrid denture, comprising:
    a three-dimensional (3D) scanner configured to capture patient data;
    a computing device comprising a processor and a memory operably coupled to the processor, wherein the memory has computer-executable instructions stored thereon that, when executed by the processor, cause the processor to:
        receive the patient data captured by the 3D scanner, the patient data comprising a post-surgical virtual waxup of an upper or lower arch of a patient, wherein the post-surgical virtual waxup includes respective positions of a plurality of implants;
        select a digital tooth model from a library comprising a plurality of different digital tooth models;
        create a customized tooth model for the patient by merging the selected digital tooth model with the post-surgical virtual waxup and changing a respective pose of at least one tooth in the selected digital tooth model;
        create a customized reinforcing bar model based on the respective positions of the plurality of implants within the post-surgical virtual waxup;
        provide a spacing layer having a predetermined thickness over at least a portion of the customized reinforcing bar model;
        merge the customized tooth model with the customized reinforcing bar model with the spacing layer; and
        generate milling instructions for the hybrid denture; and
    a milling machine configured to mill the hybrid denture using the instructions.

2. The system of claim 1, wherein the predetermined thickness is about 0.2 millimeter (mm).

3. The system of claim 1, wherein the predetermined thickness is between about 0.2 mm and 0.5 mm.

4. The system of claim 1, wherein the memory has further computer-executable instructions stored thereon that, when executed by the processor, cause the processor to create a plurality of fastener channels corresponding to each of the plurality of implants in the customized tooth model and the customized reinforcing bar model.

5. The system of claim 1, further comprising a three-dimensional (3D) facial scanner configured to capture pre-surgical patient data, wherein the memory has further computer-executable instructions stored thereon that, when executed by the processor, cause the processor to receive the pre-surgical patient data captured by the 3D facial scanner.

6. The system of claim 1, wherein the selected digital tooth model comprises a plurality of digital teeth arranged in an arch-specific relationship.

7. The system of claim 1, wherein the post-surgical virtual waxup comprises three-dimensional (3D) scan data of at least one of:
    a post-surgical impression model of the upper or lower arch of the patient;
    the post-surgical impression model of the upper or lower arch of the patient with a plurality of implant scan markers installed therein; and
    the post-surgical impression model of the upper or lower arch of the patient with a wax bite rim applied thereto.

8. The system of claim 1, wherein the patient data further comprises 3D scan data of a pre-surgical impression model of the upper or lower arch of the patient.

9. The system of claim 1, wherein the hybrid denture is a permanent hybrid denture.

* * * * *